US012632233B2

(12) United States Patent
Zhang et al.

(10) Patent No.: US 12,632,233 B2
(45) Date of Patent: May 19, 2026

(54) INTEGRATING LOOP UNROLLING AND LOOP SPLITTING TO REDUCE CONTROL OVERHEADS

(71) Applicant: International Business Machines Corporation, Armonk, NY (US)

(72) Inventors: Jintao Zhang, White Plains, NY (US); Prasanth Chatarasi, White Plains, NY (US); Vijayalakshmi Srinivasan, New York, NY (US); Kamlesh Kumar, Bengaluru (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 256 days.

(21) Appl. No.: 18/433,813

(22) Filed: Feb. 6, 2024

(65) Prior Publication Data

US 2025/0251920 A1     Aug. 7, 2025

(51) Int. Cl.
    G06F 8/41            (2018.01)
(52) U.S. Cl.
    CPC .................................. G06F 8/4434 (2013.01)
(58) Field of Classification Search
    CPC ...................................................... G06F 8/4434
    USPC ................................................ 717/154–161
    See application file for complete search history.

(56) References Cited

U.S. PATENT DOCUMENTS

| | | |
|---|---|---|
| 6,247,173 B1 | 6/2001 | Subrahmanyam |
| 6,948,160 B2 | 9/2005 | Click et al. |

| | | | |
|---|---|---|---|
| 7,062,762 B2 * | 6/2006 | Krishnamurthy ..... | G06F 9/3891 |
| | | | 712/201 |
| 7,120,907 B2 | 10/2006 | Roediger et al. | |
| 9,424,079 B2 | 8/2016 | Rossbach et al. | |
| 10,078,505 B2 | 9/2018 | Craik et al. | |
| 10,649,777 B2 | 5/2020 | Shapira et al. | |
| 12,182,552 B2 * | 12/2024 | Agarwal ................ | G06F 8/443 |
| 2006/0048122 A1 | 3/2006 | Barton et al. | |

OTHER PUBLICATIONS

Mueller, "Handling Irreducible Loops: Optimized Node Splitting vs. DJ-Graphs", 2001, Euro-Par 2001, Manchester, UK, 14 pages. (Year: 2001).*

Falk et al., "Control Flow driven Splitting of Loop Nests at the Source Code Level", 2003, IEEE, 6 pages. (Year: 2003).*

(Continued)

*Primary Examiner* — Ted T. Vo

(74) *Attorney, Agent, or Firm* — L. Jeffrey Kelly

(57)            ABSTRACT

Described are techniques for reducing overhead controls. A loop tree is constructed from a program, such as a structured control flow program. Structured control flow refers to a programming concept where the flow of control to a block or region is based on single entry and single-exist methodology (SESE). A loop tree refers to a tree-like data structure that graphically represents loop(s) and/or an if-condition(s) in a program, such as a structured control flow program. A loop splitting operation or a loop unrolling operation may then be performed in connection with the node of the loop tree that is identified as having the highest benefit (ratio of execution cycles gained to the increase in code size) representing an if-condition or a loop, respectively, provided that the resultant code fits in the instruction buffer.

20 Claims, 14 Drawing Sheets

(56) References Cited

OTHER PUBLICATIONS

Karthik Srinivasa Murthy, "Code Generation for Extreme Scale Parallel Systems," Thesis Submitted in Partial Fulfillment of the Requirements for the Degree Doctor of Philosophy, Rice University, Mar. 2017, pp. 1-150.

GCC, "GCC Release Series: Changes, New Features, and Fixes," https://gcc.gnu.org/gcc-7/changes.html, 2022, pp. 1-3.

Ayala et al., "Optimal Loop-Unrolling Mechanisms and Architectural Extensions for an Energy-Efficient Design of Shared Register Files in MPSoCs," Proceedings of the Innovative Architecture for Future Generation High-Performance Processors and Systems (IWIA'05), 2005, pp. 1-7.

\* cited by examiner

Figure 5:
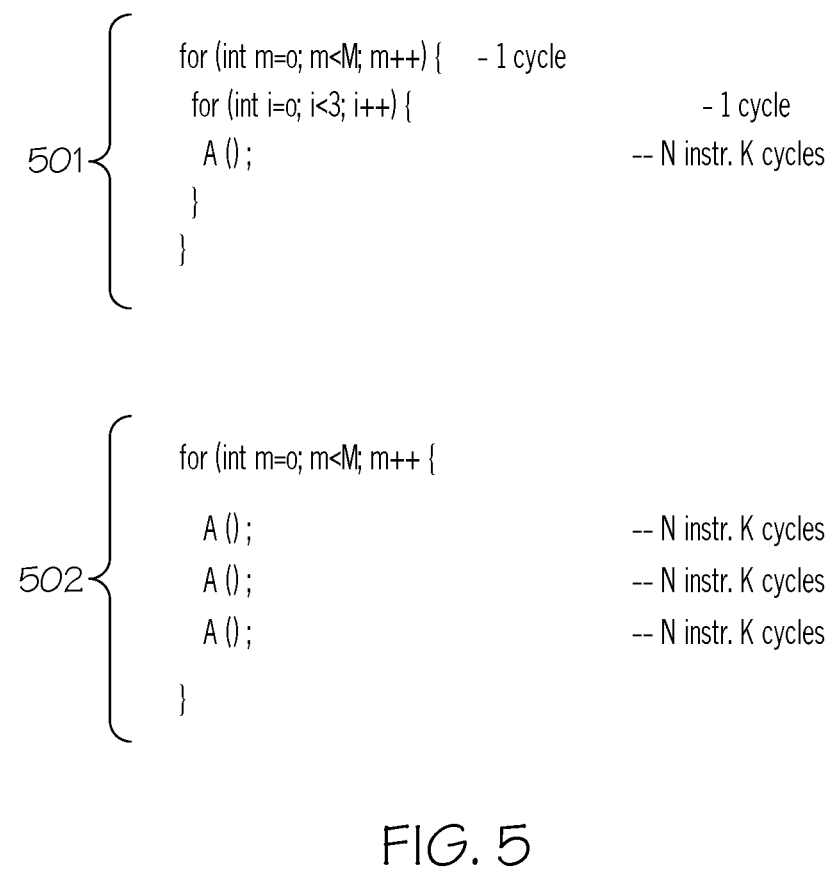

```
for (int m=o; m<M; m++) {    - 1 cycle
  for (int i=o; i<3; i++) {                    - 1 cycle
    A () ;                        -- N instr. K cycles
  }
}
```

501

```
for (int m=o; m<M; m++ {

A () ;                         -- N instr. K cycles
  A () ;                         -- N instr. K cycles
  A () ;                         -- N instr. K cycles

601 {
```
for (int m=0; m<M; m++ {        - 1 cycle
for (int i=0; i<3; i++) {        - 1 cycle
  if (i<2) {                     - 2 cycles, 1 instr.
  A () ;                         - a cycles
  } else {                       - 1 cycle, no instr.
  B () ;                         - b cycles
  }
  }
}
```

602 {
```
for (int m=0; m<M; m++ {        - 1 cycle
  for (i=0; i<2; i++ {           - 1 cycle, 1 instr.
        A () ;                   - a cycles
  }
  for (i=2; i<3; i++) {          - 1 cycle, 1 instr.
        B () ;                   - b cycles
  }
}
```

FIG. 6

```
       For i-loop = 0 to M
       if (i – loop < 10) {
            A ( ) ;
       }
801    If (i – loop < = 9) {
            B ( ) ;
       }
       C ( ) ;
       }
```

Original

Splitting i-loop considering
both if-conditions

⟶

```
       For (i-loop = 0 to 9) {
            A ( ) ;
            B ( ) ;
            C ( ) ;
       }
802    For (i-loop = 10 to M) {
            C ( ) ;
       }
```

Output

```
For (j-loop = 0 to M) {
For (i - loop = 0 to 10) { if (i<2) {
    A ();
    } else {

B ();
    }
    if (i<5) {

C ();
    }
     if (i<8) {
D ();
    } else {
    E ();

}
    F ();
    }
}
```

Original

Splitting i-loop considering
all conditions

⟶

902

```
For (j-loop = 0 to M) {
For (i - loop = 0 to 1) {
    A ();
    C ();
    E ();
    F ();
}
For (i-loop = 2 to 5) {
    B ();
    C ();
    E ();
    F ();
}
For (i-loop = 6 to 8) {
    B ();
    E ();
    F ();
}
For (i-loop = 9 to 10) {
    B ();
    D ();
    F ();
}
}
```

Output (splitting i-loop iteration space into
4 partitions)

FIG. 9

| iv | I < 2 | I >= 2 | I < 5 | I > 8 | I <= 8 |
|---|---|---|---|---|---|
| 9 | 0 | 1 | 0 | 1 | 0 |
| 8 | 0 | 1 | 0 | 0 | 1 |
| 7 | 0 | 1 | 0 | 0 | 1 |
| 6 | 0 | 1 | 0 | 0 | 1 |
| 5 | 0 | 1 | 0 | 0 | 1 |
| 4 | 0 | 1 | 1 | 0 | 1 |
| 3 | 0 | 1 | 1 | 0 | 1 |
| 2 | 0 | 1 | 1 | 0 | 1 |
| 1 | 1 | 0 | 1 | 0 | 1 |
| 0 | 1 | 0 | 1 | 0 | 1 |

| iv | I < 2 | I >= 2 | I < 5 | I > 8 | I <= 8 |
|---|---|---|---|---|---|
| | 1001 / 1002 | 1003 | 1004 | 1005 | 1006 |
| 9 | 0 | 1 | 0 | 1 | 0 |
| 8 | 0 | 1 | 0 | 0 | 1 |
| 7 | 0 | 1 | 0 | 0 | 1 |
| 6 | 0 | 1 | 0 | 0 | 1 |
| 5 | 0 | 1 | 0 | 0 | 1 |
| 4 | 0 | 1 | 1 | 0 | 1 |
| 3 | 0 | 1 | 1 | 0 | 1 |
| 2 | 0 | 1 | 1 | 0 | 1 |
| 1 | 1 | 0 | 1 | 0 | 1 |
| 0 | 1 | 0 | 1 | 0 | 1 |

1000

1104

1103

1102

1101

1000

| iv (1001) | I < 2 (a) (1002) | I >= 2 (b) (1003) | I < 5 (c) (1004) | I > 8 (d) (1005) | I <= 8 (e) (1006) | Cost (1201) |
|---|---|---|---|---|---|---|
| 9 | 0 | 1 | 0 | 1 | 0 | A |
| 8 | 0 | 1 | 0 | 0 | 1 | |
| 7 | 0 | 1 | 0 | 0 | 1 | |
| 6 | 0 | 1 | 0 | 0 | 1 | B |
| 5 | 0 | 1 | 0 | 0 | 1 | |
| 4 | 0 | 1 | 1 | 0 | 1 | |
| 3 | 0 | 1 | 1 | 0 | 1 | C |
| 2 | 0 | 1 | 1 | 0 | 1 | |
| 1 | 1 | 0 | 1 | 0 | 1 | D |
| 0 | 1 | 0 | 1 | 0 | 1 | |

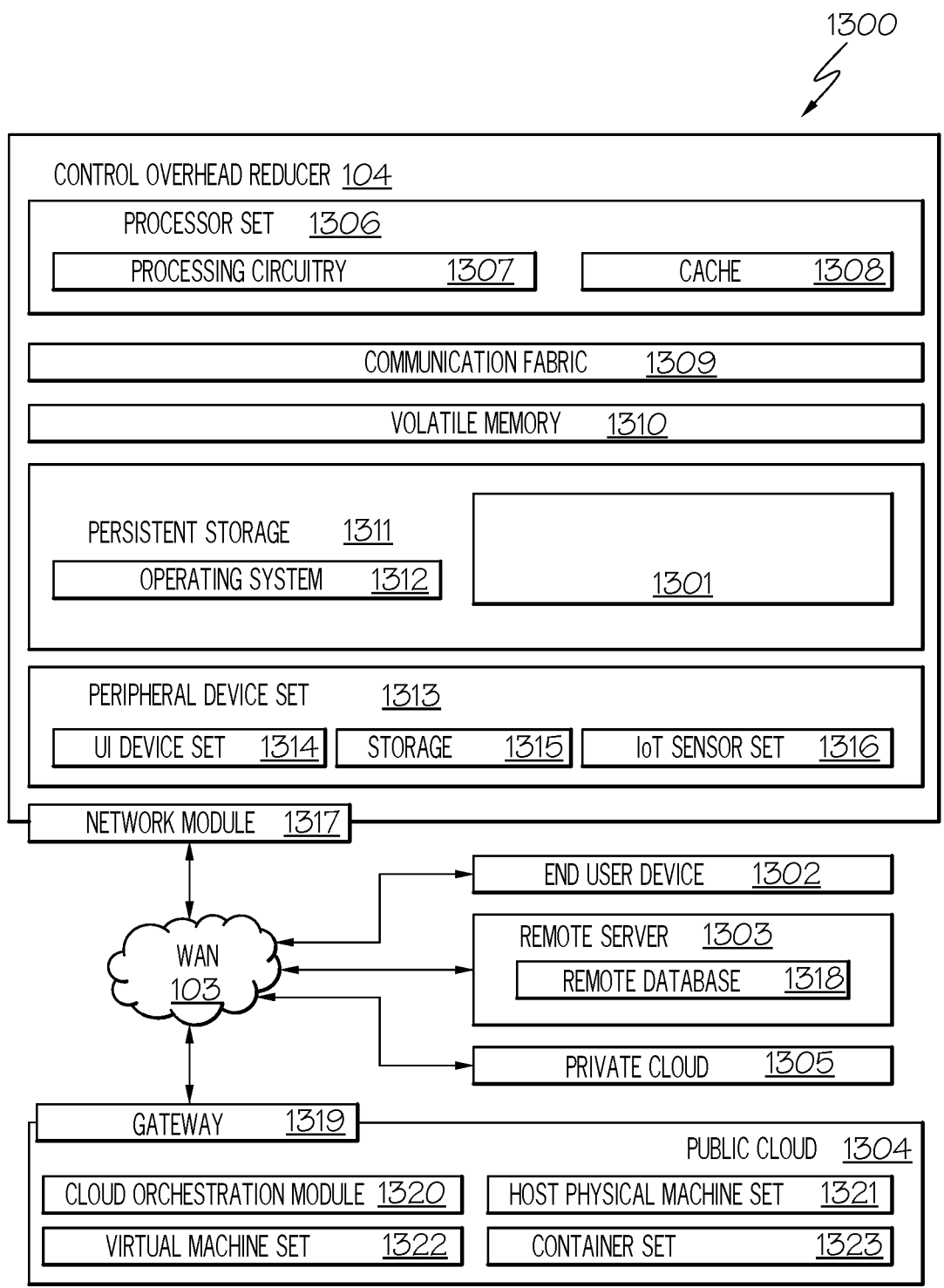

CONTROL OVERHEAD REDUCER 104

PROCESSOR SET 1306

PROCESSING CIRCUITRY 1307     CACHE 1308

COMMUNICATION FABRIC 1309

VOLATILE MEMORY 1310

PERSISTENT STORAGE 1311

OPERATING SYSTEM 1312

1301

PERIPHERAL DEVICE SET 1313

UI DEVICE SET 1314     STORAGE 1315     IoT SENSOR SET 1316

NETWORK MODULE 1317

END USER DEVICE 1302

REMOTE SERVER 1303

REMOTE DATABASE 1318

WAN 103

PRIVATE CLOUD 1305

GATEWAY 1319

PUBLIC CLOUD 1304

CLOUD ORCHESTRATION MODULE 1320     HOST PHYSICAL MACHINE SET 1321

VIRTUAL MACHINE SET 1322     CONTAINER SET 1323

FIG. 13

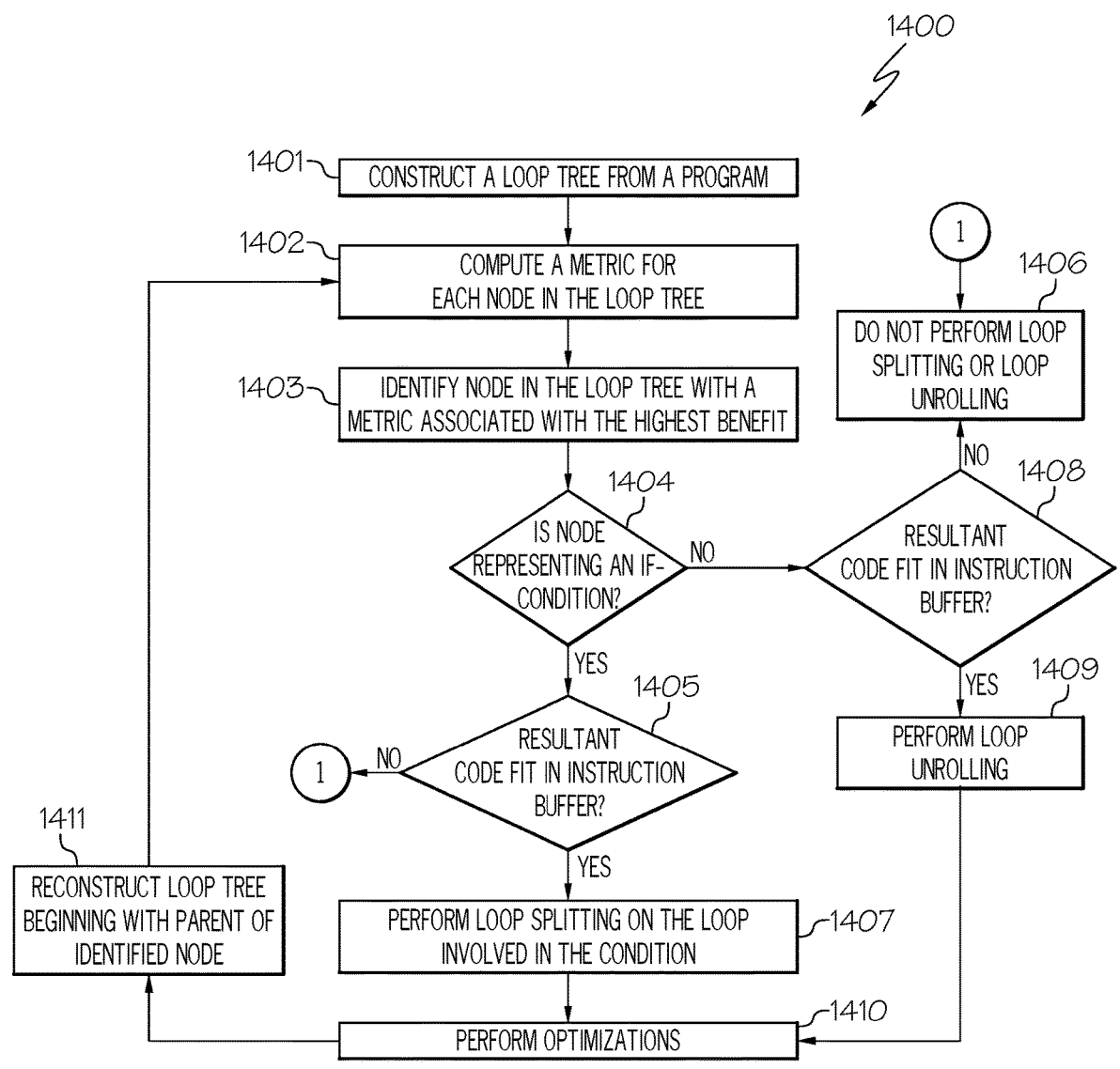

1400

1401 — CONSTRUCT A LOOP TREE FROM A PROGRAM

1402 — COMPUTE A METRIC FOR EACH NODE IN THE LOOP TREE

1403 — IDENTIFY NODE IN THE LOOP TREE WITH A METRIC ASSOCIATED WITH THE HIGHEST BENEFIT

1404 — IS NODE REPRESENTING AN IF-CONDITION?

NO → 1408 — RESULTANT CODE FIT IN INSTRUCTION BUFFER?

1406 — DO NOT PERFORM LOOP SPLITTING OR LOOP UNROLLING

NO

YES

1405 — RESULTANT CODE FIT IN INSTRUCTION BUFFER?

NO → 1

YES

1409 — PERFORM LOOP UNROLLING

1407 — PERFORM LOOP SPLITTING ON THE LOOP INVOLVED IN THE CONDITION

1411 — RECONSTRUCT LOOP TREE BEGINNING WITH PARENT OF IDENTIFIED NODE

1410 — PERFORM OPTIMIZATIONS

FIG. 14

INTEGRATING LOOP UNROLLING AND LOOP SPLITTING TO REDUCE CONTROL OVERHEADS

TECHNICAL FIELD

The present disclosure relates generally to control overheads.

BACKGROUND

Overhead is any combination of excess or indirect computation time, memory, bandwidth, or other resources that are required to perform a specific task. Control overheads in program execution refer to the additional computational costs incurred by the program due to the need to perform various control operations, such as branching and looping.

Branching is the process of making decisions in a program by choosing one of two or more paths based on a condition. The overhead is the additional processing time required to evaluate the condition and determine the correct path to take.

Looping involves repeating a set of instructions multiple times. The overhead is the additional processing time required to perform each iteration of the loop.

While control overheads are necessary for program execution, excessive control overheads can result in slower program performance, increased memory usage, and other performance issues.

One classical transformation to reduce control overheads is loop unrolling. Loop unrolling involves reducing the number of iterations a loop performs by executing multiple iterations (unroll factor) of the loop in a single pass. In loop unrolling, the loop is unrolled completely so that each iteration of the loop is replaced by a single instance of the loop body. Unfortunately, loop unrolling results in the increase in the size of the resulting code, which can negatively impact cache efficiency and instruction fetching. For example, in the case of programmable accelerators, instructions involved in the loop unrolling transformation may be stored in an instruction buffer (storage to hold instructions) which may be limited in size. As a result, there may not be enough space in the instruction buffer to store such instructions.

Another classical transformation to reduce control overheads is loop splitting. Loop splitting involves splitting a loop into multiple sub-loops, each with a different loop index set, so that each sub-loop executes a different subset of the original loop iterations. In particular, loop splitting reduces the number of branches and conditional statements required to manage loop control. By dividing the loop into smaller sub-loops, each sub-loop can be executed without the need for complex control statements. Unfortunately, loop splitting increases the size of the resulting code. In the case of programmable accelerators, as with the loop unrolling transformation, instructions involved in the loop splitting transformation may be stored in an instruction buffer which may be limited in size. As a result, there may not be enough space in the instruction buffer to store such instructions.

Consequently, loop unrolling and loop splitting transformations may compete for space in the instruction buffer, and it is not always optimal to perform one before the other. For example, by performing a loop unrolling transformation followed by a loop splitting transformation, there may not be enough room left in the instruction buffer to perform the loop splitting transformation after unrolling the loop. Similarly, in another example, by performing a loop splitting transformation followed by a loop unrolling transformation, there may not be enough room left in the instruction buffer to perform the loop unrolling transformation after performing the loop splitting transformation.

Therefore, there is not currently a means for effectively reducing control overheads for programs, such as in the case for programmable accelerators, using instruction buffers limited in size.

SUMMARY

In one embodiment of the present disclosure, a computer-implemented method for reducing control overheads comprises constructing a loop tree from a program. The method further comprises performing an operation selected from the group consisting of a loop splitting operation in response to a node of the loop tree representing an if-condition and a loop unrolling operation in response to a node of the loop tree representing a loop.

Furthermore, in one embodiment of the present disclosure, the method additionally comprises computing a metric for each node in the loop tree. Furthermore, the method comprises identifying the node in the loop tree with a metric associated with a ratio of execution cycles gained to an increase in code size having a highest value.

Additionally, in one embodiment of the present disclosure, the loop splitting operation is performed on a loop involved with the if-condition in response to the node being associated with the ratio of execution cycles gained to the increase in code size having the highest value and in response to the node representing the if-condition.

Furthermore, in one embodiment of the present disclosure, the loop unrolling operation is performed on the loop in response to the node being associated with the ratio of execution cycles gained to the increase in code size having the highest value and in response to the node representing the loop.

Additionally, in one embodiment of the present disclosure, the method further comprises splitting a loop considering multiple if-conditions in response to the program containing equivalent loop conditions with multiple conditional branches.

Furthermore, in one embodiment of the present disclosure, the method additionally comprises determining a number of partitions to be used to split a loop iteration space based on estimated saved cycles and an estimated increase in code size. The method further comprises splitting the loop iteration space into the determined number of partitions in response to the program containing different loop conditions with multiple conditional branches.

Additionally, in one embodiment of the present disclosure, the program is a structured control flow program.

Other forms of the embodiments of the computer-implemented method described above are in a system and in a computer program product.

Accordingly, embodiments of the present disclosure reduce control overheads for programs, such as in the case for programmable accelerators, using instruction buffers limited in size.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 5 illustrates computing the metric for a node representing a loop in the program in accordance with an embodiment of the present disclosure;

FIG. 6 illustrates computing the metric for a node representing an if-condition in the program in accordance with an embodiment of the present disclosure;

FIG. 8 illustrates splitting the loop considering multiple if-conditions if the program has equivalent loop conditions with multiple conditional branches in accordance with an embodiment of the present disclosure;

FIG. 9 illustrates splitting the loop iteration space into partitions if the program has different loop conditions with multiple conditional branches in accordance with an embodiment of the present disclosure;

FIG. 10 illustrates a splitting table for determining the number of partitions to be used in splitting the loop iteration space in the program of FIG. 9 in accordance with an embodiment of the present disclosure;

FIG. 12 illustrates selecting the partitions based on the estimated execution cycles gained and the estimated increment in the code size in accordance with an embodiment of the present disclosure;

FIG. 13 illustrates an embodiment of the present disclosure of the hardware configuration of the control overhead reducer which is representative of a hardware environment for practicing the present disclosure;

FIG. 14 is a flowchart of a method for reducing control overheads for programs using instruction buffers limited in size in accordance with an embodiment of the present disclosure.

DETAILED DESCRIPTION

Figure 1:
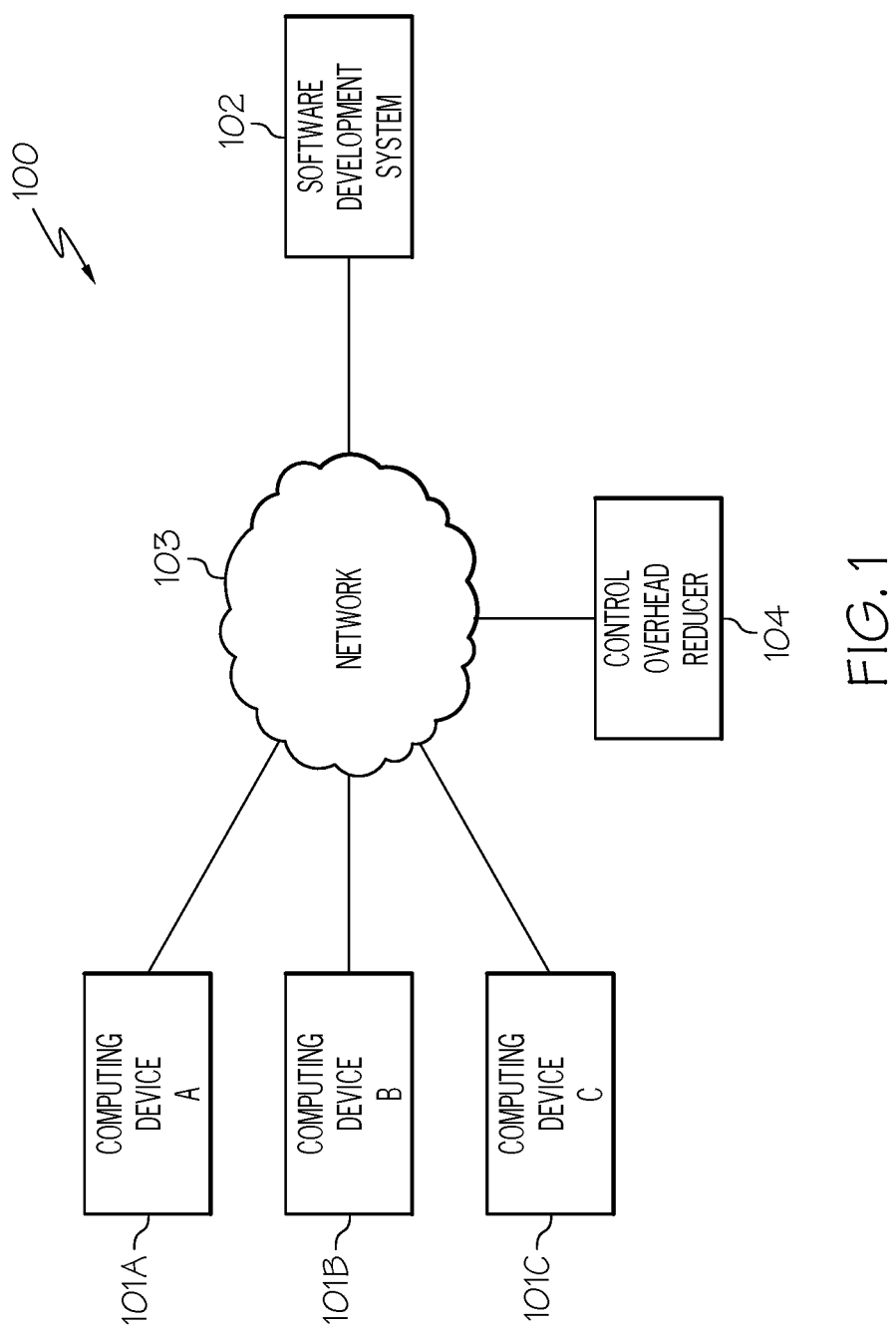
FIG. 1 illustrates a communication system for practicing the principles of the present disclosure in accordance with an embodiment of the present disclosure.

In one embodiment of the present disclosure, a computer-implemented method for reducing control overheads comprises constructing a loop tree from a program. The method further comprises performing an operation selected from the group consisting of a loop splitting operation in response to a node of the loop tree representing an if-condition and a loop unrolling operation in response to a node of the loop tree representing a loop.

In this manner, control overheads for programs, such as in the case for programmable accelerators, using instruction buffers limited in size are reduced.

Furthermore, in one embodiment of the present disclosure, the method additionally comprises computing a metric for each node in the loop tree. Furthermore, the method comprises identifying the node in the loop tree with a metric associated with a ratio of execution cycles gained to an increase in code size having a highest value.

In this manner, the node in the loop associated with the highest benefit corresponding to the ratio of execution cycles gained to an increase in code size can be determined. Upon identifying the node with the highest benefit, a loop splitting operation or a loop unrolling operation is performed based on whether the node represents an if-command or a loop, respectively.

Additionally, in one embodiment of the present disclosure, the loop splitting operation is performed on a loop involved with the if-condition in response to the node being associated with the ratio of execution cycles gained to the increase in code size having the highest value and in response to the node representing the if-condition.

In this manner, the loop splitting operation is performed for the loop involved in the if-condition represented by the node and if the resulting code can fit within the instruction buffer.

Furthermore, in one embodiment of the present disclosure, the loop unrolling operation is performed on the loop in response to the node being associated with the ratio of execution cycles gained to the increase in code size having the highest value and in response to the node representing the loop.

In this manner, the loop unrolling operation is performed for the loop represented by the node and if the resulting code can fit within the instruction buffer.

Additionally, in one embodiment of the present disclosure, the method further comprises splitting a loop considering multiple if-conditions in response to the program containing equivalent loop conditions with multiple conditional branches.

In this manner, loop splitting can be enhanced for programs containing equivalent loop conditions with multiple conditional branches.

Furthermore, in one embodiment of the present disclosure, the method additionally comprises determining a number of partitions to be used to split a loop iteration space based on estimated saved cycles and an estimated increase in code size. The method further comprises splitting the loop iteration space into the determined number of partitions in response to the program containing different loop conditions with multiple conditional branches.

In this manner, loop splitting can be enhanced for programs containing different loop conditions with multiple conditional branches.

Additionally, in one embodiment of the present disclosure, the program is a structured control flow program.

In this manner, control overheads for programs, such as structured control flow programs, can be reduced.

Other forms of the embodiments of the computer-implemented method described above are in a system and in a computer program product.

As stated above, branching is the process of making decisions in a program by choosing one of two or more paths based on a condition. The overhead is the additional processing time required to evaluate the condition and determine the correct path to take.

Looping involves repeating a set of instructions multiple times. The overhead is the additional processing time required to perform each iteration of the loop.

While control overheads are necessary for program execution, excessive control overheads can result in slower program performance, increased memory usage, and other performance issues.

One classical transformation to reduce control overheads is loop unrolling. Loop unrolling involves reducing the number of iterations a loop performs by executing multiple iterations (unroll factor) of the loop in a single pass. In loop unrolling, the loop is unrolled completely so that each iteration of the loop is replaced by a single instance of the loop body. Unfortunately, loop unrolling results in the increase in the size of the resulting code, which can negatively impact cache efficiency and instruction fetching. For example, in the case of programmable accelerators, instructions involved in the loop unrolling transformation may be stored in an instruction buffer (storage to hold instructions) which may be limited in size. As a result, there may not be enough space in the instruction buffer to store such instructions.

Another classical transformation to reduce control overheads is loop splitting. Loop splitting involves splitting a loop into multiple sub-loops, each with a different loop index set, so that each sub-loop executes a different subset of the original loop iterations. In particular, loop splitting reduces the number of branches and conditional statements required to manage loop control. By dividing the loop into smaller sub-loops, each sub-loop can be executed without the need for complex control statements. Unfortunately, loop splitting increases the size of the resulting code. In the case of programmable accelerators, as with the loop unrolling transformation, instructions involved in the loop splitting transformation may be stored in an instruction buffer which may be limited in size. As a result, there may not be enough space in the instruction buffer to store such instructions.

Consequently, loop unrolling and loop splitting transformations may compete for space in the instruction buffer, and it is not always optimal to perform one before the other. For example, by performing a loop unrolling transformation followed by a loop splitting transformation, there may not be enough room left in the instruction buffer to perform the loop splitting transformation after unrolling the loop. Similarly, in another example, by performing a loop splitting transformation followed by a loop unrolling transformation, there may not be enough room left in the instruction buffer to perform the loop unrolling transformation after performing the loop splitting transformation.

Therefore, there is not currently a means for effectively reducing control overheads for programs, such as in the case for programmable accelerators, using instruction buffers limited in size.

The embodiments of the present disclosure provide a means for reducing control overheads for programs, such as in the case for programmable accelerators, using instruction buffers limited in size by constructing a loop tree from a program, such as a structured control flow program. Structured control flow, as used herein, refers to a programming concept where the flow of control to a block or region is based on single entry and single-exist methodology (SESE). In such a programming concept, during execution, the execution of the (structured) statement starts from one defined point and the execution terminates at one defined point. A metric, such as the estimated saved cycles and the estimated increase in code size, is computed for each node in the loop tree, where each node in the tree represents a loop (loop is a sequence of instructions that is continually repeated until a certain condition is reached) or an if-condition (conditional statement that executes a block of code if a specified condition is true). The estimated saved cycles, as used herein, refers to the number of cycles saved by performing a transformation, such as loop splitting for an if-condition or loop unrolling for a loop. Furthermore, the estimated increase in code size, as used herein, refers to the increase in the code size as a result of performing a transformation, such as loop splitting for an if-condition or loop unrolling for a loop. Upon identifying the node with a metric associated with the highest benefit, such as the greatest increase in execution cycles gained with the least amount of increase in the number of instructions, loop splitting is performed on the loop involved in the condition for the identified node representing an if-condition or loop unrolling is performed on the loop for the identified node representing such a loop provided that the resultant code fits in the instruction buffer. The "highest benefit," as used herein, refers to the ratio of execution cycles gained to the increase in code size (number of instructions) having the highest value. Upon performing loop splitting or loop unrolling, optimizations may then be performed, such as removing dead code (code that does not affect the program results), constant propagation (substituting the values of known constants in expressions at compile time), etc. The loop tree may then be reconstructed with the parent of the identified node. In this manner, control overheads for programs, such as in the case for programmable accelerators, using instruction buffers limited in size may be reduced. A further discussion regarding these and other features is provided below.

In some embodiments of the present disclosure, the present disclosure comprises a computer-implemented method, system, and computer program product for reducing overhead controls. In one embodiment of the present disclosure, a loop tree is constructed from a program, such as a structured control flow program. Structured control flow, as used herein, refers to a programming concept where the flow of control to a block or region is based on single entry and single-exist methodology (SESE). In such a programming concept, during execution, the execution of the (structured) statement starts from one defined point and the execution terminates at one defined point. A loop tree, as used herein, refers to a tree-like data structure that graphically represents loop(s) and/or an if-condition(s) in a program, such as a structured control flow program. In one embodiment, a loop tree is constructed from a program by creating a set of classes or structures to represent the nodes and relationships within the tree. Such nodes may then be inserted (adding nodes) or deleted (removing nodes) via the AddChild method or DeleteChild method, respectively. A loop splitting operation or a loop unrolling operation may then be performed in connection with the node of the loop tree that is identified as having the highest benefit (ratio of execution cycles gained to the increase in code size (number of instructions) having the highest value) and if the resulting code fits in the instruction buffer. In one embodiment, the loop splitting operation is performed on the loop involved in the condition for the node (node with the highest benefit) representing an if-condition provided that the resultant code fits in the instruction buffer or the loop unrolling operation is performed on the loop for the node (node with the highest benefit) representing such a loop provided that the resultant code fits in the instruction buffer. In this manner, control overheads for programs, such as in the case for programmable accelerators, using instruction buffers limited in size may be reduced.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a software development system 102 via a network 103. Computing devices 101A-101C may collectively or individually be referred to as computing devices 101 or computing device 101, respectively.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance, and the like) configured with the capability of connecting to network 103 and consequently communicating with other computing devices 101 and software development system 102. It is noted that both computing device 101 and the user of computing device 101 may be identified with element number 101.

Software development system 102 is a system utilized, such as by software programmers and software developers (e.g., users of computing devices 101), in the process of creating, designing, deploying, and supporting software, including programs, such as structured control flow programs. Examples of such software development systems, can include, but are not limited to, RAD Studio®, Embold®, Collaborator®, Studio 3T®, NetBeans®, Zend Studio®, Microsoft® Expression Studio, etc.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 902.11 standards network, various combinations thereof, etc. Other networks, whose descriptions are omitted here for brevity, may also be used in conjunction with system 100 of FIG. 1 without departing from the scope of the present disclosure.

System 100 further includes a control overhead reducer 104 connected to network 103. Control overhead reducer 104 is configured to reduce control overheads for programs, such as in the case for programmable accelerators, using instruction buffers limited in size. As previously discussed, control overheads in program execution refer to the additional computational costs incurred by the program due to the need to perform various control operations, such as branching and looping.

In one embodiment, control overhead reducer 104 reduces control overheads for programs by constructing a loop tree from the program, such as a structured control flow program. Structured control flow, as used herein, refers to a programming concept where the flow of control to a block or region is based on single entry and single-exist methodology (SESE). In such a programming concept, during execution, the execution of the (structured) statement starts from one defined point and the execution terminates at one defined point.

Furthermore, in one embodiment, control overhead reducer 104 computes a metric, such as the estimated saved cycles and the estimated increase in code size, for each node in the loop tree, where each node in the tree represents a loop (loop is a sequence of instructions that is continually repeated until a certain condition is reached) or an if-condition (conditional statement that executes a block of code if a specified condition is true). The estimated saved cycles, as used herein, refer to the number of cycles saved by performing a transformation, such as loop splitting for an if-condition or loop unrolling for a loop. Furthermore, the estimated increase in code size, as used herein, refers to the increase in the code size as a result of performing a transformation, such as loop splitting for an if-condition or loop unrolling for a loop.

Upon identifying the node with a metric associated with the highest benefit, such as the greatest increase in execution cycles gained with the least amount of increase in code size (number of instructions), loop splitting is performed on the loop involved in the condition for the identified node representing an if-condition provided that the resultant code fits in the instruction buffer or loop unrolling is performed on the loop for the identified node representing such a loop provided that the resultant code fits in the instruction buffer. The "highest benefit," as used herein, refers to the ratio of execution cycles gained to the increase in code size (number of instructions) having the highest value. "Execution cycle," as used herein, refers to where the processor performs the actual computation or manipulation of data. "Execution cycles gained," as used herein, refers to the reduction in the number of execution cycles that need to be performed.

Upon performing loop splitting or loop unrolling, control overhead reducer 104 performs optimizations, such as removing dead code (code that does not affect the program results), constant propagation (substituting the values of known constants in expressions at compile time), etc. between each loop splitting or loop unrolling.

In one embodiment, control overhead reducer 104 enhances loop splitting by considering all the conditions on a loop iterator together and partitioning the loop as opposed to the traditional approach of considering one condition after another. In one embodiment, the loop is split considering multiple if-conditions if the program has equivalent loop conditions, including after optimizations, with multiple conditional branches. In one embodiment, the number of partitions to be used to split the loop iteration space (iterations performed by the program, such as a structured control flow program) is determined based on the estimated cycles gained and the estimated increase in the code size if the program has different loop conditions with multiple conditional branches. The loop iteration space is then split based on the determined number of partitions.

Furthermore, control overhead reducer 104 performs a speculative analysis to estimate the execution cycles gained and the increase in program size. In one embodiment, such an analysis involves determining whether a naïve approach for estimating the execution cycles gained and the increase in program size or using a cost model for estimating the execution cycles gained and increase in program size is the better approach. In one embodiment, the naïve approach is selected to be used for estimating the execution cycles gained and the increase in program size when the increase in program size is less than or equal to the increase in program size using the cost model. Otherwise, the cost model is used for estimating the execution cycles gained and the increase in program size. The naïve approach, as used herein, refers to a simplistic approach, such as assuming that the overall loop execution overhead is 1 cycle with sufficient pipelining. The cost model, as used herein, refers to a model used in the analysis of algorithms to define what constitutes a single step in the execution of an algorithm. For example, the cost model may assume that the loop execution overhead is 1 cycle, but if the parent loop has M iterations, then the execution overhead of a child loop is M cycles.

In one embodiment, control overhead reducer 104 reconstructs the loop tree with the parent of the node that was identified as being associated with the metric with the highest benefit. After reconstructing the loop tree, a metric is computed for each node in the reconstructed loop tree as discussed above.

A description of the software components of control overhead reducer 104 used for reducing control overheads for programs, such as in the case for programmable accelerators, using instruction buffers limited in size is provided below in connection with FIG. 3. A description of the hardware configuration of control overhead reducer 104 is provided further below in connection with FIG. 13.

System 100 is not to be limited in scope to any one particular network architecture. System 100 may include any number of computing devices 101, software development systems 102, networks 103, and control overhead reducers 104.

In one embodiment, control overhead reducer 104 may be utilized in edge computing to reduce the overall time it takes for a processor of an edge computing device to complete a task as discussed below in connection with FIG. 2.

Figure 2:
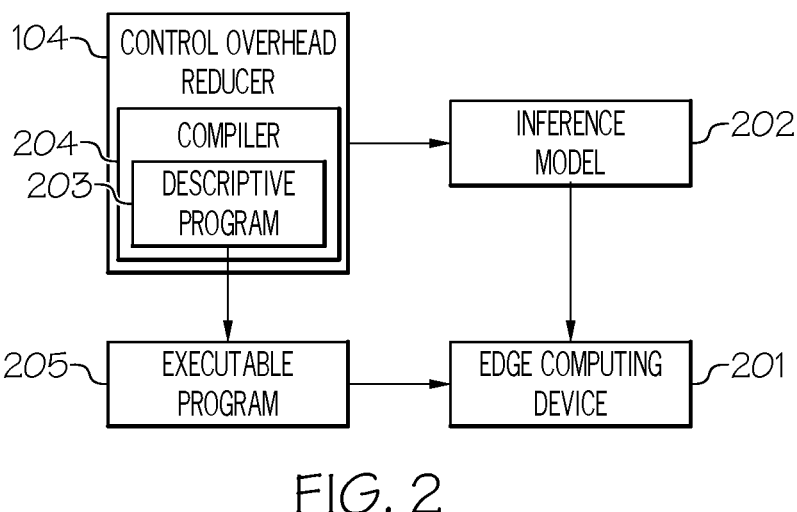
FIG. 2 illustrates reducing the overall time for an edge computing device to complete a task in accordance with an embodiment of the present disclosure.

Referring to FIG. 2, FIG. 2 illustrates reducing the overall time for an edge computing device to complete a task in accordance with an embodiment of the present disclosure.

Edge computing, as used herein, is a distributed computing paradigm that brings computation and data storage closer to the sources of data. In particular, with edge computing, the processing, analyzing, and storing of data is performed at a location where rapid, near real-time analysis and response can be performed. Such processing, analyzing, and storing of data is performed by an edge computing device 201. Due to the constraints on the computing resources of edge computing device 201, edge computing device 201 does not perform compute-heavy tasks.

As a result, compute-heavy tasks may be performed by an external computing device, such as a trainer. In one embodiment, control overhead reducer 104 corresponds to such a trainer. In one embodiment, control overhead reducer 104 serves the purpose of generating an inference model 202 from datasets, which is later used by edge computing device 201.

Furthermore, in one embodiment, control overhead reducer 104 functioning as a trainer processes a descriptive program 203, which is derived from a neural network. In one embodiment, descriptive program 203 is used to encapsulate a high-level abstraction of the computations performed, such as the computations performed on a training data set.

In one embodiment, control overhead reducer 104 includes a compiler 204 configured to translate descriptive program 203 into an executable program 205 to be executed by edge computing device 201.

In one embodiment, during the translation of descriptive program 203 into executable program 205, control overhead reducer 104 reduces the control overheads in descriptive program 203 thereby reducing the overall time it takes for the processor of edge computing device 201 to complete its task, such as processing executable program 205. A discussion regarding reducing such control overheads is provided further below.

Figure 3:
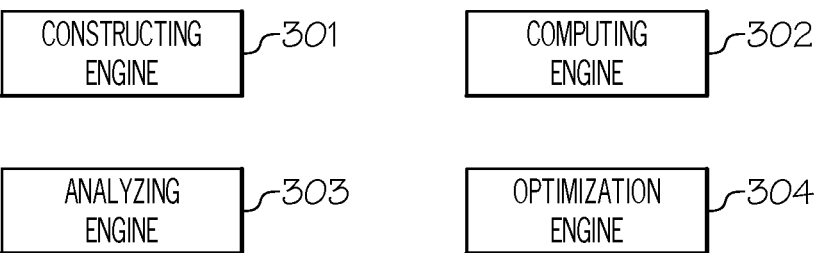
FIG. 3 is a diagram of the software components used by the control overhead reducer for reducing control overheads for programs using instruction buffers limited in size in accordance with an embodiment of the present disclosure.

Referring now to FIG. 3, FIG. 3 is a diagram of the software components used by control overhead reducer 104 for reducing control overheads for programs, such as in the case for programmable accelerators, using instruction buffers limited in size in accordance with an embodiment of the present disclosure.

As shown in FIG. 3, control overhead reducer 104 includes a constructing engine 301 configured to construct a loop tree from a program, such as a structured control flow program. Structured control flow, as used herein, refers to a programming concept where the flow of control to a block or region is based on single entry and single-exist methodology (SESE). In such a programming concept, during execution, the execution of the (structured) statement starts from one defined point and the execution terminates at one defined point.

A loop tree, as used herein, refers to a tree-like data structure that graphically represents loop(s) and/or an if-condition(s) in a program, such as a structured control flow program. In one embodiment, constructing engine 301 constructs a loop tree from a program by creating a set of classes or structures to represent the nodes and relationships within the tree. Such nodes may then be inserted (adding nodes) or deleted (removing nodes) via the AddChild method or DeleteChild method, respectively.

In one embodiment, constructing engine 301 constructs a loop tree from a program by adding the root node into a queue with a put method and iterating while the queue is not empty. Constructing engine 301 then obtains the first node in the queue and prints its value. Later, constructing engine 301 adds both the left and right children into the queue (if the current node has children).

In one embodiment, constructing engine 301 utilizes various software tools for constructing a loop tree from a program, which can include, but are not limited to, Grpahviz®, Gource, CodeSee®, etc.

Figure 4:
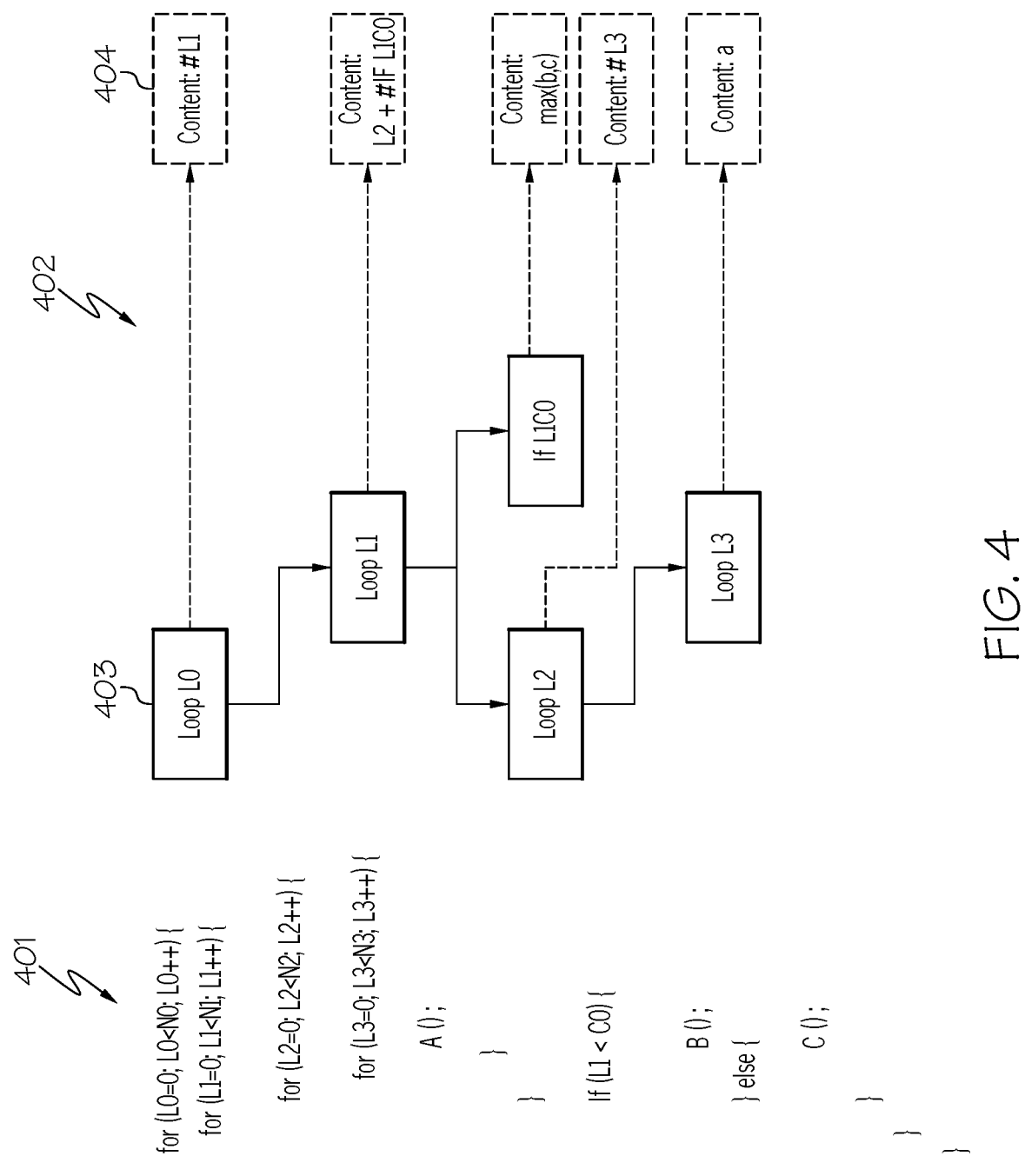
FIG. 4 illustrates an example of a loop tree constructed from a program in accordance with an embodiment of the present disclosure.

An example of constructing a loop tree from a program, such as a structured control flow program, is provided in FIG. 4.

FIG. 4 illustrates an example of a loop tree constructed from a program, such as a structured control program, in accordance with an embodiment of the present disclosure.

As shown in FIG. 4, code 401 includes various loops, such as for loops. In one embodiment, constructing engine 301 constructs a loop tree 402 as a tree-like data structure that graphically represents a loop(s) (loop is a sequence of instructions that is continually repeated until a certain condition is reached) and/or an if-condition(s) (conditional statement that executes a block of code if a specified condition is true) in a program, such as a structured control flow program.

In one embodiment, each node 403 in loop tree 402 represents either a loop or an if-condition. For example, as illustrated in FIG. 4, constructing engine 301 graphically represents loops L0, L1, L2 and L3 from code 401 as nodes 403 in tree structure 402. Furthermore, constructing engine 301 graphically represents an if-condition (If L1C0) as a node 403 in loop tree 402, where a comparison is made to determine if L1<C0 in code 401. Furthermore, in one embodiment, loop tree 402 graphically illustrates the relationships between such nodes 403.

In one embodiment, each node 403 is associated with content 404, which may correspond to execution cycles gained and the increase in the code size (number of instructions) by performing loop unrolling or loop splitting as discussed further below.

In one embodiment, the edges of loop tree 402 represent the control flow.

Returning to FIG. 3, in conjunction with FIGS. 1 and 4, control overhead reducer 104 further includes computing engine 302 configured to compute a metric for each node 403 in loop tree 402. For example, computing engine 302 may compute a metric corresponding to the estimated saved cycles and the estimated increase in code size for each node 403 in loop tree 402. The estimated saved cycles, as used herein, refers to the number of cycles saved by performing a transformation, such as loop splitting for an if-condition or loop unrolling for a loop. Furthermore, the estimated increase in code size, as used herein, refers to the increase in the code size as a result of performing a transformation, such as loop splitting for an if-condition or loop unrolling for a loop. It is noted that such transformations are performed to determine the metrics associated with each node 403 in loop tree 402, but such transformations may not actually be implemented in the final code version. As discussed further below, transformations are implemented in the final code version for those nodes 403 ranked by a metric with the highest benefit.

Loop unrolling (also known as loop unwinding), as used herein, is a loop transformation technique that attempts to optimize a program's execution speed at the expense of its binary size, which is an approach known as space-time tradeoff. In one embodiment, the transformation is undertaken by computing engine 302 via an optimizing compiler. An optimizing compiler, as used herein, is a compiler that tries to minimize or maximize some attributes of an executable computer program. For example, the optimizing compiler may be configured to perform loop unrolling whose goal is to increase a program's speed by reducing or eliminating instructions that control the loop, such as pointer arithmetic and "end of loop" tests on each iteration, reducing branch penalties as well as hiding latencies, including the delay in reading data from memory. To eliminate this computational/control overhead, loops can be re-written as a repeated sequence of similar independent statements.

Loop splitting, as used herein, is a compiler optimization technique which attempts to simplify a loop or eliminate dependencies by breaking it into multiple loops which have the same bodies but iterate over different contiguous portions of the index range.

In one embodiment, computing engine 302 utilizes a performance analysis tool, such as LoopTool or LoopReport by Oracle®, to read the files created by these compilers performing loop unrolling and loop splitting. Such an analysis tool may be utilized to assess the cycle savings (or execution cycles gained) and increase in program size by performing such transformations. "Execution cycles gained," as used herein, refers to the reduction in the number of execution cycles that need to be performed, such as a result of the transformation (e.g., loop splitting, loop unrolling). "Program size," as used herein, refers to the number of lines of code, which is increased as a result of the transformation (e.g., loop splitting, loop unrolling).

In one embodiment, computing engine 302 performs a speculative analysis to compute such metrics, such as estimating the execution cycles gained and the increase in program size. In one embodiment, such an analysis involves determining whether a naïve approach for estimating the execution cycles gained and increase in program size or using a cost model for estimating the execution cycles gained and increase in program size is the better approach. In one embodiment, the naïve approach is selected to be used for estimating the execution cycles gained and increase in program size when the increase in code size is less than or equal to the increase in code size using the cost model. Otherwise, the cost model is used for estimating the execution cycles gained and increase in program size. The naïve approach, as used herein, refers to a simplistic approach, such as assuming that the overall loop execution overhead is 1 cycle with sufficient pipelining. The cost model, as used herein, refers to a model used in the analysis of algorithms to define what constitutes a single step in the execution of an algorithm. For example, the cost model may assume that the loop execution overhead is 1 cycle, but if the parent loop has M iterations, then the execution overhead of a child loop is M cycles.

An example of computing engine 302 computing the metric for a node (e.g., node 403) representing a loop in the program is provided in FIG. 5.

FIG. 5 illustrates computing the metric for a node (e.g., 403) representing a loop in the program in accordance with an embodiment of the present disclosure.

Referring to FIG. 5, in conjunction with FIGS. 1-4, a node 403 in tree structure 402 may be associated with a loop, such as represented by code 501. Since such a node is associated with a loop, computing engine 302 performs a loop unrolling transformation on code 501.

In one embodiment, the loop unrolling transformation on code 501 involves rewriting the loop of code 501 as a repeated sequence of similar independent statements as shown in the resulting code 502.

As discussed above, such a loop unrolling transformation may be performed by an optimizing compiler whose file created regarding such a transformation is analyzed using a performance analysis tool, such as LoopTool or LoopReport by Oracle®. Such an analysis tool may be utilized to assess the execution cycles gained and increase in program size. For example, in the example of FIG. 5, it is assumed that code block A ( ) contains N instructions and takes K cycles to execute those N instructions. In one embodiment, such an analysis to assess the execution cycles gained and increase in program size may utilize a naïve approach in which the overall loop execution overhead is 1 cycle with sufficient pipelining. In one embodiment, such an analysis may utilize a cost model in which it is assumed that the loop execution overhead is 1 cycle, but if the parent loop (e.g., m-loop) has M iterations, then the execution overhead of the child loop (e.g., i-loop) is M cycles.

Based on the analysis performed by the analysis tool, the unrolling of the loop surrounding code block A( ) results in a code size increment from N+2 to 3N+1, but the execution cycle changes from 1+M (KN+1) to 1+M*KN thereby saving M cycles at the cost of incrementing the code size by 2N−1.

An example of computing engine 302 computing the metric for a node (e.g., node 403) representing an if-condition in the program is provided in FIG. 6.

FIG. 6 illustrates computing the metric for a node (e.g., node 403) representing an if-condition in the program in accordance with an embodiment of the present disclosure.

Referring to FIG. 6, in conjunction with FIGS. 1-4, a node 403 in tree structure 402 may be associated with an if-condition, such as represented by code 601. Since such a node is associated with an if-condition, computing engine 302 performs a loop splitting transformation on code 601.

In one embodiment, the loop splitting transformation on code 601 involves breaking the loop into multiple loops which have the same bodies but iterate over different contiguous portions of the index range as shown in the resulting code 602.

As discussed above, such loop splitting transformations may be performed by an optimizing compiler whose file created regarding such a transformation is analyzed using a performance analysis tool, such as LoopTool or LoopReport by Oracle®. Such an analysis tool may be utilized to assess the execution cycles gained and increase in program size. For example, in the example of FIG. 6, the code size remains unchanged (a+b+2), but the execution time changes from $1+M(1+2(a+2)+ (b+1))$ to $1+M(2(a+1)+ (b+1))$ saving 2M execution cycles.

Figure 7:
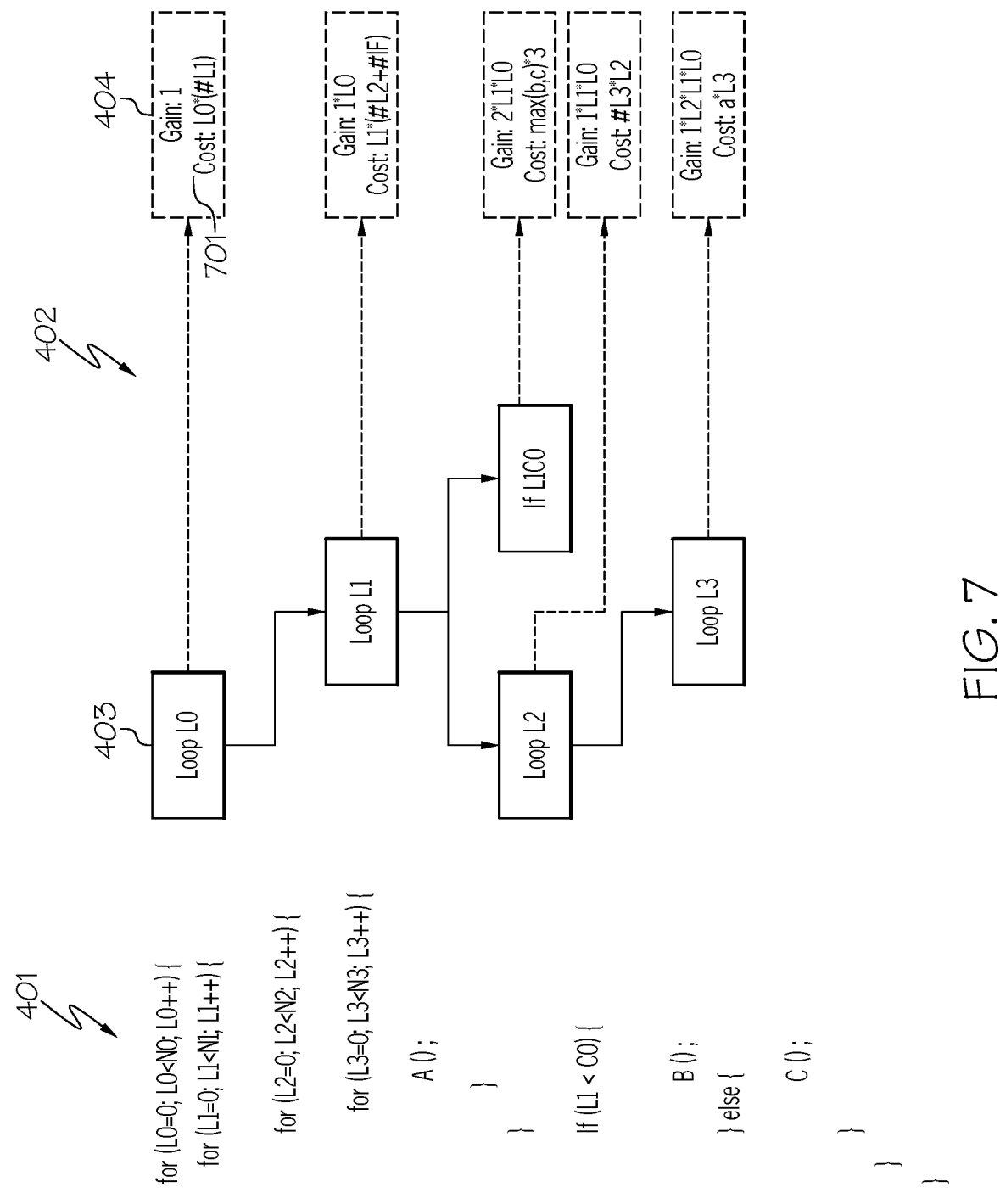
FIG. 7 illustrates inputting the metrics in the constructed loop tree in accordance with an embodiment of the present disclosure.

In one embodiment, such metrics (gain in execution cycles, increase in program size) computed by computing engine 302 may be reflected in loop tree 402 such as shown in FIG. 7.

FIG. 7 illustrates inputting the metrics in the constructed loop tree in accordance with an embodiment of the present disclosure.

Referring to FIG. 7, metrics 701 are inputted into content 404 in loop tree 402 by computing engine 302 after the analysis of the transformation is performed as discussed above.

Returning to FIG. 3, in conjunction with FIGS. 1 and 4-7, control overhead reducer 104 further include analyzing engine 303 configured to identify the node (e.g., node 403) in loop tree 402 with the matric associated with the highest benefit. As discussed above, a metric, such as the estimated execution cycles gained and the estimated increase in code size, is computed for each node (e.g., node 403) in the loop tree (e.g., loop tree 402), where each node in the loop tree represents a loop (loop is a sequence of instructions that is continually repeated until a certain condition is reached) or an if-condition (conditional statement that executes a block of code if a specified condition is true). The execution cycles gained, as used herein, refers to the reduction in the number of execution cycles that need to be performed, such as a result of the transformation (e.g., loop splitting, loop unrolling). Furthermore, the estimated increase in code size, as used herein, refers to the increase in the code size as a result of performing a transformation, such as loop splitting for an if-condition or loop unrolling for a loop. The "highest benefit," as used herein, refers to the ratio of execution cycles gained to the increase in code size (number of instructions) having the highest value.

In one embodiment, analyzing engine 303 identifies node 403 in loop tree 402 with the metric associated with the highest benefit by analyzing metrics 701 in loop tree 402 and identifying the metric with the ratio of execution cycles gained to the increase in program size having the highest value.

Upon identifying the node (e.g., node 403) in the loop tree (e.g., loop tree 402) with the metric associated with the highest value, analyzing engine 303 performs loop splitting on the loop involved in the condition if node 403 represents an if-condition. In one embodiment, analyzing engine 303 performs loop splitting on the loop involved in the condition if node 403 is associated with an if-condition and if the resulting code fits within an instruction buffer limited in size, especially for programs for programmable accelerators. As discussed above, loop splitting, as used herein, is a compiler optimization technique which attempts to simplify a loop or eliminate dependencies by breaking it into multiple loops which have the same bodies but iterate over different contiguous portions of the index range. As discussed above, such a transformation is performed in the final version of the code.

In one embodiment, upon identifying the node (e.g., node 403) in the loop tree (e.g., loop tree 402) with the metric associated with the highest value, analyzing engine 303 performs loop splitting on the loop represented by node 403 if node 403 represents a loop as opposed to an if-condition. In one embodiment, analyzing engine 303 performs loop unrolling on the loop represented by node 403 if node 403 represents a loop as opposed to an if-condition and if the resulting code fits within an instruction buffer limited in size, especially for programs for programmable accelerators. As discussed above, loop unrolling, as used herein, is a loop transformation technique that attempts to optimize a program's execution speed at the expense of its binary size, which is an approach known as space-time tradeoff. In one embodiment, the transformation is undertaken by analyzing engine 303 via an optimizing compiler. As discussed above, such a transformation is performed in the final version of the code.

In one embodiment, analyzing engine 303 is configured to enhance loop splitting by considering all the conditions on a loop iterator together and partitioning the loop as opposed to the traditional approach of considering one condition after another.

In one embodiment, analyzing engine 303 enhances loop splitting by splitting the loop considering multiple if-conditions if the program (e.g., structed control flow program) has equivalent loop conditions, including after optimizations (discussed further below), with multiple conditional branches as illustrated in FIG. 8.

FIG. 8 illustrates splitting the loop considering multiple if-conditions if the structured control flow program has equivalent loop conditions with multiple conditional branches in accordance with an embodiment of the present disclosure.

Referring to FIG. 8, code 801 corresponds to the original code of the program, such as a structured control flow program, that includes equivalent loop conditions (e.g., i-loop<10 and i-loop<=9) with multiple conditional branches. In such a scenario, analyzing engine 303 splits the loop (e.g., i-loop=0 to 9 and i-loop=10 to M) considering the multiple if-conditions as shown in the resulting code 802. By considering multiple conditions together, better decisions may result including helping the cost model to be aware of the potential benefits from dead-code elimination (removing code that does not affect the program results).

In one embodiment, analyzing engine 303 enhances loop splitting by splitting the loop iteration space (iterations performed by the structured control flow program) into a number of partitions, if the program, such as a structured control flow program, has different loop conditions with multiple conditional branches as illustrated in FIG. 9.

FIG. 9 illustrates splitting the loop iteration space into partitions if the program, such as a structured control flow program, has different loop conditions with multiple conditional branches in accordance with an embodiment of the present disclosure.

Referring to FIG. 9, code 901 corresponds to the original code of the program, such as a structured control flow program, that includes different loop conditions (e.g., i-loop=0 to 10 and j-loop=0 to M) with multiple conditional branches. In such a scenario, analyzing engine 303 splits the loop iteration space (e.g., i-loop iteration space) into partitions (e.g., i-loop=0 to 1, i-loop=2 to 5, i-loop=6 to 8, and i-loop=9 to 10) as shown in the resulting code 902.

However, spitting of the loop iteration space into partitions may not fit in the instruction buffer. As a result, a smaller number of partitions may need to be utilized.

In one embodiment, analyzing engine 303 constructs a table (referred to herein as the "splitting table") for a loop based on the conditions referring to the loop iterator as illustrated in FIG. 10.

FIG. 10 illustrates a splitting table for determining the number of partitions to be used in splitting the loop iteration space in the program of FIG. 9 in accordance with an embodiment of the present disclosure.

Referring to FIG. 10, in conjunction with FIG. 9, FIG. 10 illustrates splitting table 1000 for a loop based on all conditions (e.g., <2) referring to the loop iterator (e.g., i-loop) of code 901.

As shown in FIG. 10, column 1001 includes the iteration variable (iv) value, column 1002 indicates which iteration (e.g., iteration 0, iteration 1) has an iteration value less than 2, column 1003 indicates which iteration (e.g., iteration 2, iteration 3, iteration 4, iteration 5, iteration 6, iteration 7, iteration 8, iteration 9) has an iteration value greater than or equal to 2, column 1004 indicates which iteration (e.g., iteration 0, iteration 1, iteration 2, iteration 3, iteration 4) has an iteration value less than 5, column 1005 indicates which iteration (iteration 9) has an iteration value greater than 8, and column 1006 indicates which iteration (iteration 0, iteration 1, iteration 2, iteration 3, iteration 4, iteration 5, iteration 6, iteration 7, iteration 8) has an iteration value less than or equal to 8. In one embodiment, such columns 1002-1006 indicate which iterations satisfy the criteria (e.g., iteration value less than 2) based on having a logical value of one in the column identifying the iteration in the corresponding row of splitting table 1000.

Figure 11:
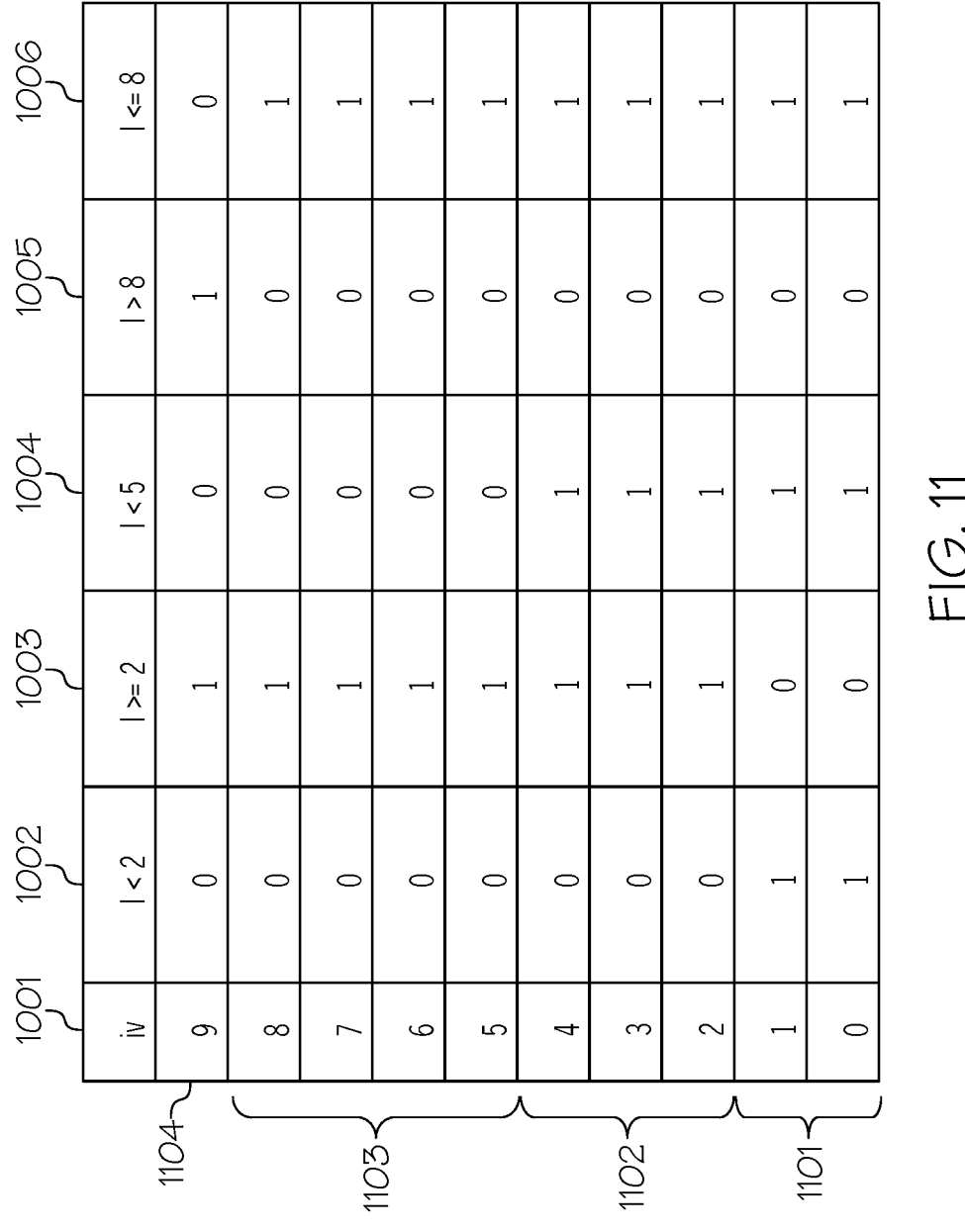
FIG. 11 illustrates identifying the partitions by grouping the contiguous iteration variable rows in the splitting table with the set of conditions in the columns of the splitting table being the same in accordance with an embodiment of the present disclosure.

In one embodiment, analyzing engine 303 identifies the partitions by grouping the contiguous iteration variable rows with the set of conditions in the columns of splitting table 1000 being the same as illustrated in FIG. 11.

FIG. 11 illustrates identifying the partitions by grouping the contiguous iteration variable rows in splitting table 1000 with the set of conditions in the columns (e.g., columns 1002-1006) of splitting table 1000 being the same in accordance with an embodiment of the present disclosure.

As shown in FIG. 11, grouped rows 1101, 1102, 1103, and 1104 of splitting table 1000 correspond to those iteration variable rows with the same set of conditions in columns 1002-1006. For example, grouped row 1101 corresponds to grouping iteration variable rows 0 and 1. Grouped row 1102 corresponds to grouping iteration variable rows 2, 3 and 4. Grouped row 1103 corresponds to grouping iteration variable rows 5, 6, 7 and 8. Grouped row 1104 corresponds to a single iteration variable row, row 9.

Since not all of the partitions calculated from the grouping may fit in the instruction buffer, a metric, such as a cost metric, may be utilized to determine the optimal set of partitions that fit in the instruction buffer and maximize cycle savings. In one embodiment, such a metric corresponds to the estimated execution cycles gained and the estimated increment in the code size. In one embodiment, the estimated execution cycles gained corresponds to: (number of split IfOps)*2*Outer Bounds. IfOps, as used herein, refer to if operations in the code. Outer bounds, as used herein, refer to the loop bound, which is the upper bound of the number of loop iterations for a given program. In one embodiment, the estimated increment in the code size corresponds to: (code size not within the split)*2. In one embodiment, the cost metric corresponds to a ratio of the execution cycles gained to the increment in the code size. As illustration of selecting the partitions (e.g., partitions 1101, 1102) based on the estimated execution cycles gained and the estimated increment in the code size is provided in FIG. 12.

FIG. 12 illustrates selecting the partitions (e.g., partitions 1101, 1102) based on the estimated execution cycles gained and the estimated increment in the code size in accordance with an embodiment of the present disclosure.

Referring to FIG. 12, in conjunction with FIGS. 10-11, splitting table 1000 includes a column 1201 for the cost metric (e.g., A, B, C, D) associated with each of the partitions (e.g., partitions 1101, 1102, 1103, 1104). In one embodiment, analyzing engine 303 selects the optimal set of partitions (e.g. partitions 1101, 1102) that fits in the instruction buffer limited in size based on those partitions that maximize the execution cycles gained while limiting the increase in code size.

After analyzing engine 303 determines the optimal set or number of partitions that fits in the instruction buffer limited in size, analyzing engine 303 splits the loop iteration space for the program (e.g., structured control flow program) having different loop conditions with multiple conditional branches based on the determined number of partitions as discussed above in connection with FIG. 9.

Control overhead reducer 104 further includes an optimization engine 304 configured to perform optimizations on the resulting code (code after the transformation has been performed), such as removing dead code (code that does not affect the program results), constant propagation (substituting the values of known constants in expressions at compile time), etc.

In one embodiment, optimization engine 304 utilizes various software tools for performing such optimizations, which can include, but are not limited to, LinearB®, Project Analyzer by Aivosto, SCARF, etc. Furthermore, in one embodiment, optimization engine 304 utilizes an optimizing compiler for performing such optimizations.

In one embodiment, upon optimizing the resulting code, constructing engine 301 reconstructs loop tree 402 beginning with the parent of node 403 identified with the metric associated with the highest benefit as discussed above. That is, constructing engine 301 reconstructs loop tree 402 with the root node of the tree corresponding to the parent of node 403 that was identified with the metric associated with the highest benefit.

In this manner, control overheads for programs, such as in the case for programmable accelerators, using instruction buffers limited in size may be reduced.

A further description of these and other features is provided below in connection with the discussion of the method for reducing control overheads for programs, such as in the case for programmable accelerators, using instruction buffers limited in size.

Prior to the discussion of the method for reducing control overheads for programs, such as in the case for programmable accelerators, using instruction buffers limited in size, a description of the hardware configuration of control overhead reducer 104 (FIG. 1) is provided below in connection with FIG. 13.

Referring now to FIG. 13, in conjunction with FIG. 1, FIG. 13 illustrates an embodiment of the present disclosure of the hardware configuration of control overhead reducer 104 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1300 contains an example of an environment for the execution of at least some of the computer code (stored in block 1301) involved in performing the disclosed methods, such as reducing control overheads for programs, such as in the case for programmable accelerators, using instruction buffers limited in size. In addition to block 1301, computing environment 1300 includes, for example, control overhead reducer 104, network 103, such as a wide area network (WAN), end user device (EUD) 1302, remote server 1303, public cloud 1304, and private cloud 1305. In this embodiment, control overhead reducer 104 includes processor set 1306 (including processing circuitry 1307 and cache 1308), communication fabric 1309, volatile memory 1310, persistent storage 1311 (including operating system 1312 and block 1301, as identified above), peripheral device set 1313 (including user interface (UI) device set 1314, storage 1315, and Internet of Things (IoT) sensor set 1316), and network module 1317. Remote server 1303 includes remote database 1318. Public cloud 1304 includes gateway 1319, cloud orchestration module 1320, host physical machine set 1321, virtual machine set 1322, and container set 1323.

Control overhead reducer 104 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1318. As is well understood in the art of computer technology, and depending upon the technology, performance of a computer-implemented method may be distributed among multiple computers and/or between multiple locations. On the other hand, in this presentation of computing environment 1300, detailed discussion is focused on a single computer, specifically control overhead reducer 104, to keep the presentation as simple as possible. Control overhead reducer 104 may be located in a cloud, even though it is not shown in a cloud in FIG. 13. On the other hand, control overhead reducer 104 is not required to be in a cloud except to any extent as may be affirmatively indicated.

Processor set 1306 includes one, or more, computer processors of any type now known or to be developed in the future. Processing circuitry 1307 may be distributed over multiple packages, for example, multiple, coordinated integrated circuit chips. Processing circuitry 1307 may implement multiple processor threads and/or multiple processor cores. Cache 1308 is memory that is located in the processor chip package(s) and is typically used for data or code that should be available for rapid access by the threads or cores running on processor set 1306. Cache memories are typically organized into multiple levels depending upon relative proximity to the processing circuitry. Alternatively, some, or all, of the cache for the processor set may be located "off chip." In some computing environments, processor set 1306 may be designed for working with qubits and performing quantum computing.

Computer readable program instructions are typically loaded onto control overhead reducer 104 to cause a series of operational steps to be performed by processor set 1306 of control overhead reducer 104 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 1308 and the other storage media discussed below. The program instructions, and associated data, are accessed by processor set 1306 to control and direct performance of the disclosed methods. In computing environment 1300, at least some of the instructions for performing the disclosed methods may be stored in block 1301 in persistent storage 1311.

Communication fabric 1309 is the signal conduction paths that allow the various components of control overhead reducer 104 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1310 is any type of volatile memory now known or to be developed in the future. Examples include dynamic type random access memory (RAM) or static type RAM. Typically, the volatile memory is characterized by random access, but this is not required unless affirmatively indicated. In control overhead reducer 104, the volatile memory 1310 is located in a single package and is internal to control overhead reducer 104, but, alternatively or additionally, the volatile memory may be distributed over multiple packages and/or located externally with respect to control overhead reducer 104.

Persistent Storage 1311 is any form of non-volatile storage for computers that is now known or to be developed in the future. The non-volatility of this storage means that the stored data is maintained regardless of whether power is being supplied to control overhead reducer 104 and/or directly to persistent storage 1311. Persistent storage 1311 may be a read only memory (ROM), but typically at least a portion of the persistent storage allows writing of data, deletion of data and re-writing of data. Some familiar forms of persistent storage include magnetic disks and solid state storage devices. Operating system 1312 may take several forms, such as various known proprietary operating systems or open source Portable Operating System Interface type operating systems that employ a kernel. The code included in block 1301 typically includes at least some of the computer code involved in performing the disclosed methods.

Peripheral device set 1313 includes the set of peripheral devices of control overhead reducer 104. Data communication connections between the peripheral devices and the other components of control overhead reducer 104 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1314 may include components such as a display screen, speaker, microphone, wearable devices (such as goggles and smart watches), keyboard, mouse, printer, touchpad, game controllers, and haptic devices. Storage 1315 is external storage, such as an external hard drive, or insertable storage, such as an SD card. Storage 1315 may be persistent and/or volatile. In some embodiments, storage 1315 may take the form of a quantum computing storage device for storing data in the form of qubits. In embodiments where control overhead reducer 104 is required to have a large amount of storage (for example, where control overhead reducer 104 locally stores and manages a large database) then this storage may be provided by peripheral storage devices designed for storing very large amounts of data, such as a storage area network (SAN) that is shared by multiple, geographically distributed computers. IoT sensor set 1316 is made up of sensors that can be used in Internet of Things applications. For example, one sensor may be a thermometer and another sensor may be a motion detector.

Network module 1317 is the collection of computer software, hardware, and firmware that allows control overhead reducer 104 to communicate with other computers through WAN 103. Network module 1317 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1317 are performed on the same physical hardware device. In other embodiments (for example, embodiments that utilize software-defined networking (SDN)), the control functions and the forwarding functions of network module 1317 are performed on physically separate devices, such that the control functions manage several different network hardware devices. Computer readable program instructions for performing the disclosed methods can typically be downloaded to control overhead reducer 104 from an external computer or external storage device through a network adapter card or network interface included in network module 1317.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1302 is any computer system that is used and controlled by an end user (for example, a customer of an enterprise that operates control overhead reducer 104), and may take any of the forms discussed above in connection with control overhead reducer 104. EUD 1302 typically receives helpful and useful data from the operations of control overhead reducer 104. For example, in a hypothetical case where control overhead reducer 104 is designed to provide a recommendation to an end user, this recommendation would typically be communicated from network module 1317 of control overhead reducer 104 through WAN 103 to EUD 1302. In this way, EUD 1302 can display, or otherwise present, the recommendation to an end user. In some embodiments, EUD 1302 may be a client device, such as thin client, heavy client, mainframe computer, desktop computer and so on.

Remote server 1303 is any computer system that serves at least some data and/or functionality to control overhead reducer 104. Remote server 1303 may be controlled and used by the same entity that operates control overhead reducer 104. Remote server 1303 represents the machine(s) that collect and store helpful and useful data for use by other computers, such as control overhead reducer 104. For example, in a hypothetical case where control overhead reducer 104 is designed and programmed to provide a recommendation based on historical data, then this historical data may be provided to control overhead reducer 104 from remote database 1318 of remote server 1303.

Public cloud 1304 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1304 is performed by the computer hardware and/or software of cloud orchestration module 1320. The computing resources provided by public cloud 1304 are typically implemented by virtual computing environments that run on various computers making up the computers of host physical machine set 1321, which is the universe of physical computers in and/or available to public cloud 1304. The virtual computing environments (VCEs) typically take the form of virtual machines from virtual machine set 1322 and/or containers from container set 1323. It is understood that these VCEs may be stored as images and may be transferred among and between the various physical machine hosts, either as images or after instantiation of the VCE. Cloud orchestration module 1320 manages the transfer and storage of images, deploys new instantiations of VCEs and manages active instantiations of VCE deployments. Gateway 1319 is the collection of computer software, hardware, and firmware that allows public cloud 1304 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1305 is similar to public cloud 1304, except that the computing resources are only available for use by a single enterprise. While private cloud 1305 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1304 and private cloud 1305 are both part of a larger hybrid cloud.

Block 1301 further includes the software components discussed above in connection with FIGS. 3-12 to reduce control overheads for programs, such as in the case for programmable accelerators, using instruction buffers limited in size. In one embodiment, such components may be implemented in hardware. The functions discussed above performed by such components are not generic computer functions. As a result, control overhead reducer 104 is a particular machine that is the result of implementing specific, non-generic computer functions.

In one embodiment, the functionality of such software components of control overhead reducer 104, including the functionality for reducing control overheads for programs, such as in the case for programmable accelerators, using instruction buffers limited in size, may be embodied in an application specific integrated circuit.

As stated above, branching is the process of making decisions in a program by choosing one of two or more paths based on a condition. The overhead is the additional processing time required to evaluate the condition and determine the correct path to take. Looping involves repeating a set of instructions multiple times. The overhead is the additional processing time required to perform each iteration of the loop. While control overheads are necessary for program execution, excessive control overheads can result in slower program performance, increased memory usage, and other performance issues. One classical transformation to reduce control overheads is loop unrolling. Loop unrolling involves reducing the number of iterations a loop performs by executing multiple iterations (unroll factor) of the loop in a single pass. In loop unrolling, the loop is unrolled completely so that each iteration of the loop is replaced by a single instance of the loop body. Unfortunately, loop unrolling results in the increase in the size of the resulting code, which can negatively impact cache efficiency and instruction fetching. For example, in the case of programmable accelerators, instructions involved in the loop unrolling transformation may be stored in an instruction buffer (storage to hold instructions) which may be limited in size. As a result, there may not be enough space in the instruction buffer to store such instructions. Another classical transformation to reduce control overheads is loop splitting. Loop splitting involves splitting a loop into multiple sub-loops, each with a different loop index set, so that each sub-loop executes a different subset of the original loop iterations. In particular, loop splitting reduces the number of branches and conditional statements required to manage loop control. By dividing the loop into smaller sub-loops, each sub-loop can be executed without the need for complex control statements. Unfortunately, loop splitting increases the size of the resulting code. In the case of programmable accelerators, as with the loop unrolling transformation, instructions involved in the loop splitting transformation may be stored in an instruction buffer which may be limited in size. As a result, there may not be enough space in the instruction buffer to store such instructions. Consequently, loop unrolling and loop splitting transformations may compete for space in the instruction buffer, and it is not always optimal to perform one before the other. For example, by performing a loop unrolling transformation followed by a loop splitting transformation, there may not be enough room left in the instruction buffer to perform the loop splitting transformation after unrolling the loop. Similarly, in another example, by performing a loop splitting transformation followed by a loop unrolling transformation, there may not be enough room left in the instruction buffer to perform the loop unrolling transformation after performing the loop splitting transformation. Therefore, there is not currently a means for effectively reducing control overheads for programs, such as in the case for programmable accelerators, using instruction buffers limited in size.

Figure 15:
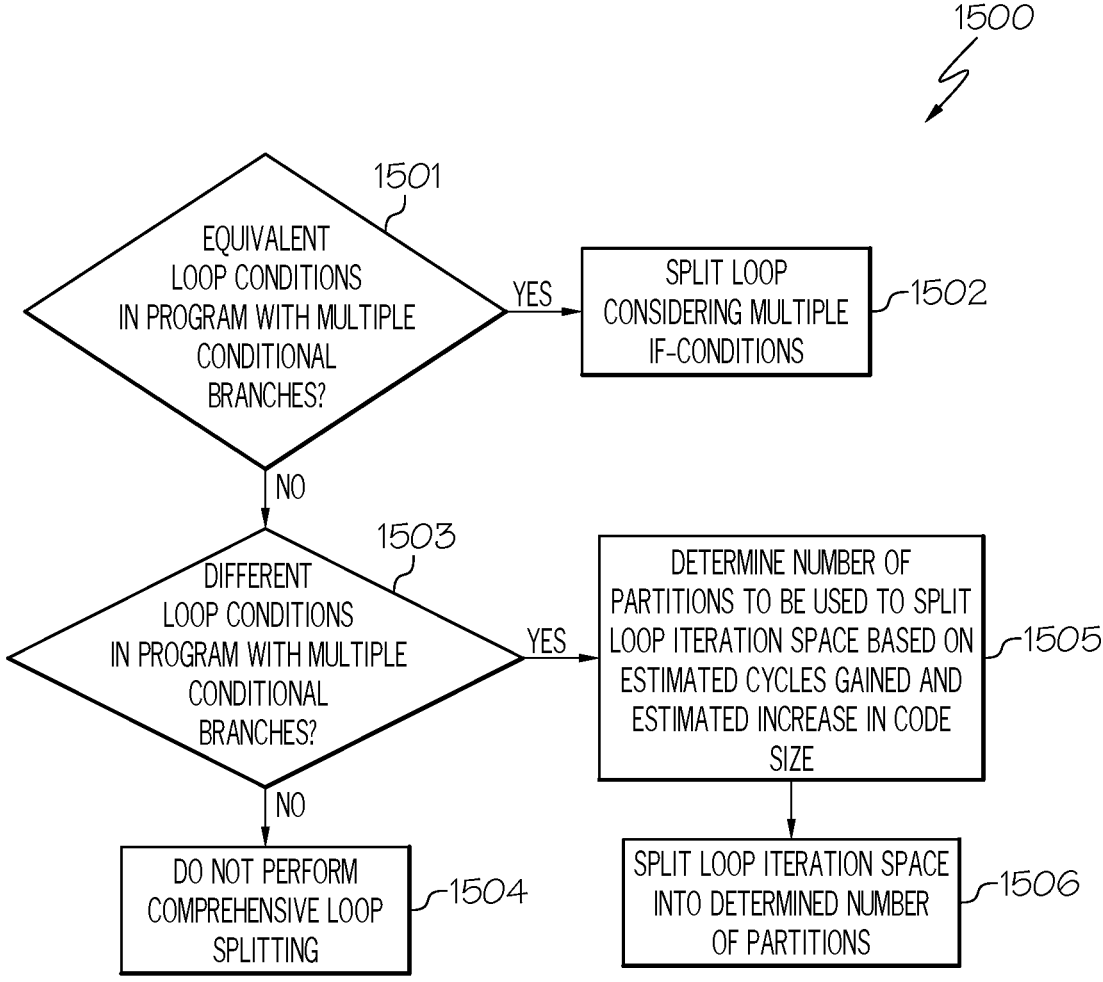
FIG. 15 is a flowchart of a method for enhancing loop splitting in accordance with an embodiment of the present disclosure.

The embodiments of the present disclosure provide a means for reducing control overheads for programs, such as in the case for programmable accelerators, using instruction buffers limited in size as discussed below in connection with FIGS. 14-15. FIG. 14 is a flowchart of a method for reducing control overheads for programs, such as in the case for programmable accelerators, using instruction buffers limited in size. FIG. 15 is a flowchart of a method for enhancing loop splitting.

As stated above, FIG. 14 is a flowchart of a method 1400 for reducing control overheads for programs, such as in the case for programmable accelerators, using instruction buffers limited in size in accordance with an embodiment of the present disclosure.

Referring to FIG. 14, in conjunction with FIGS. 1-13, in operation 1401, constructing engine 301 of control overhead reducer 104 constructs a loop tree (e.g., loop tree 402) from a program, such as a structured control flow program.

As stated above, structured control flow, as used herein, refers to a programming concept where the flow of control to a block or region is based on single entry and single-exist methodology (SESE). In such a programming concept, during execution, the execution of the (structured) statement starts from one defined point and the execution terminates at one defined point.

A loop tree (e.g., loop tree 402), as used herein, refers to a tree-like data structure that graphically represents loop(s) and/or an if-condition(s) in a program, such as a structured control flow program. In one embodiment, constructing engine 301 constructs a loop tree (e.g., loop tree 402) from a program by creating a set of classes or structures to represent the nodes (e.g., nodes 403) and relationships within the tree. Such nodes (e.g., nodes 403) may then be inserted (adding nodes) or deleted (removing nodes) via the AddChild method or DeleteChild method, respectively.

In one embodiment, constructing engine 301 constructs a loop tree (loop tree 402) from a program by adding the root node into a queue with a put method and iterating while the queue is not empty. Constructing engine 301 then obtains the first node in the queue and prints its value. Later, constructing engine 301 adds both the left and right children into the queue (if the current node has children).

In one embodiment, constructing engine 301 utilizes various software tools for constructing a loop tree (e.g., loop tree 402) from a program, which can include, but are not limited to, Grpahviz®, Gource, CodeSee®, etc.

An example of constructing a loop tree (e.g., loop tree 402) from a program, such as a structured control flow program, is provided in FIG. 4.

As shown in FIG. 4, code 401 includes various loops, such as for loops. In one embodiment, constructing engine 301 constructs a loop tree 402 as a tree-like data structure that graphically represents a loop(s) (loop is a sequence of instructions that is continually repeated until a certain condition is reached) and/or an if-condition(s) (conditional statement that executes a block of code if a specified condition is true) in a program, such as a structured control flow program.

In one embodiment, each node 403 in loop tree 402 represents either a loop or an if-condition. For example, as illustrated in FIG. 4, constructing engine 301 graphically represents loops L0, L1, L2 and L3 from code 401 as nodes (e.g., nodes 403) in tree structure 402. Furthermore, constructing engine 301 graphically represents an if-condition (If L1C0) as a node (e.g., node 403) in loop tree 402, where a comparison is made to determine if L1<C0 in code 401. Furthermore, in one embodiment, loop tree 402 graphically illustrates the relationships between such nodes (e.g. nodes 403).

In one embodiment, each node 403 is associated with content 404, which may correspond to execution cycles gained and the increase in the code size (number of instructions) by performing loop unrolling or loop splitting as discussed further below.

In one embodiment, the edges of loop tree 402 represent the control flow.

In operation 1402, computing engine 302 of control overhead reducer 104 computes a metric for each node 403 in loop tree 402.

As discussed above, for example, computing engine 302 may compute a metric corresponding to the estimated saved cycles and the estimated increase in code size for each node 403 in loop tree 402. The estimated saved cycles, as used herein, refers to the number of cycles saved by performing a transformation, such as loop splitting for an if-condition or loop unrolling for a loop. Furthermore, the estimated increase in code size, as used herein, refers to the increase in the code size as a result of performing a transformation, such as loop splitting for an if-condition (conditional statement that executes a block of code if a specified condition is true) or loop unrolling for a loop (loop is a sequence of instructions that is continually repeated until a certain condition is reached). It is noted that such transformations are performed to determine the metrics associated with each node 403 in loop tree 402, but such transformations may not actually be implemented in the final code version. As discussed herein, transformations are implemented in the final code version for only those nodes 403 associated with a metric with the highest benefit.

Loop unrolling (also known as loop unwinding), as used herein, is a loop transformation technique that attempts to optimize a program's execution speed at the expense of its binary size, which is an approach known as space-time tradeoff. In one embodiment, the transformation is undertaken by computing engine 302 via an optimizing compiler. An optimizing compiler, as used herein, is a compiler that tries to minimize or maximize some attributes of an executable computer program. For example, the optimizing compiler may be configured to perform loop unrolling whose goal is to increase a program's speed by reducing or eliminating instructions that control the loop, such as pointer arithmetic and "end of loop" tests on each iteration, reducing branch penalties as well as hiding latencies, including the delay in reading data from memory. To eliminate this computational/control overhead, loops can be re-written as a repeated sequence of similar independent statements.

Loop splitting, as used herein, is a compiler optimization technique which attempts to simplify a loop or eliminate dependencies by breaking it into multiple loops which have the same bodies but iterate over different contiguous portions of the index range.

In one embodiment, computing engine 302 utilizes a performance analysis tool, such as LoopTool or LoopReport by Oracle®, to read the files created by these compilers performing loop unrolling and loop splitting. Such an analysis tool may be utilized to assess the cycle savings (or execution cycles gained) and increase in program size by performing such transformations. "Execution cycles gained," as used herein, refers to the reduction in the number of execution cycles that need to be performed, such as a result of the transformation (e.g., loop splitting, loop unrolling). "Program size," as used herein, refers to the number of lines of code, which is increased as a result of the transformation (e.g., loop splitting, loop unrolling).

In one embodiment, computing engine 302 performs a speculative analysis to compute such metrics, such as estimating the execution cycles gained and the increase in program size. In one embodiment, such an analysis involves determining whether a naïve approach for estimating the execution cycles gained and increase in program size or using a cost model for estimating the execution cycles gained and increase in program size is the better approach. In one embodiment, the naïve approach is selected to be used for estimating the execution cycles gained and increase in program size when the increase in code size is less than or equal to the increase in code size using the cost model. Otherwise, the cost model is used for estimating the execution cycles gained and increase in program size. The naïve approach, as used herein, refers to a simplistic approach, such as assuming that the overall loop execution overhead is 1 cycle with sufficient pipelining. The cost model, as used herein, refers to a model used in the analysis of algorithms to define what constitutes a single step in the execution of an algorithm. For example, the cost model may assume that the loop execution overhead is 1 cycle, but if the parent loop has M iterations, then the execution overhead of a child loop is M cycles.

An example of computing engine 302 computing the metric for a node (e.g., node 403) representing a loop in the program is provided in FIG. 5.

Referring to FIG. 5, a node 403 in tree structure 402 may be associated with a loop, such as represented by code 501. Since such a node is associated with a loop, computing engine 302 performs a loop unrolling transformation on code 501.

In one embodiment, the loop unrolling transformation on code 501 involves rewriting the loop of code 501 as a repeated sequence of similar independent statements as shown in the resulting code 502.

As discussed above, such a loop unrolling transformation may be performed by an optimizing compiler whose file created regarding such a transformation is analyzed using a performance analysis tool, such as LoopTool or LoopReport by Oracle®. Such an analysis tool may be utilized to assess the execution cycles gained and increase in program size. For example, in the example of FIG. 5, it is assumed that code block A( ) contains N instructions and takes K cycles to execute those N instructions. In one embodiment, such an analysis to assess the execution cycles gained and increase in program size may utilize a naïve approach in which the overall loop execution overhead is 1 cycle with sufficient pipelining. In one embodiment, such an analysis may utilize a cost model in which it is assumed that the loop execution overhead is 1 cycle, but if the parent loop (e.g., m-loop) has M iterations, then the execution overhead of the child loop (e.g., i-loop) is M cycles.

Based on the analysis performed by the analysis tool, the unrolling of the loop surrounding code block A( ) results in a code size increment from N+2 to 3N+1, but the execution cycle changes from 1+M(KN+1) to 1+M*KN thereby saving M cycles at the cost of incrementing the code size by 2N−1.

An example of computing engine 302 computing the metric for a node (e.g., node 403) representing an if-condition in the program is provided in FIG. 6.

Referring to FIG. 6, a node 403 in tree structure 402 may be associated with an if-condition, such as represented by code 601. Since such a node is associated with an if-condition, computing engine 302 performs a loop splitting transformation on code 601.

In one embodiment, the loop splitting transformation on code 601 involves breaking the loop into multiple loops which have the same bodies but iterate over different contiguous portions of the index range as shown in the resulting code 602.

As discussed above, such loop splitting transformations may be performed by an optimizing compiler whose file created regarding such a transformation is analyzed using a performance analysis tool, such as LoopTool or LoopReport by Oracle®. Such an analysis tool may be utilized to assess the execution cycles gained and increase in program size. For example, in the example of FIG. 6, the code size remains unchanged (a+b+2), but the execution time changes from $1+M(1+2(a+2)+(b+1))$ to $1+M(2(a+1)+(b+1))$ saving 2M execution cycles.

In one embodiment, such metrics (gain in execution cycles, increase in program size) computed by computing engine 302 may be reflected in loop tree 402 such as shown in FIG. 7.

Referring to FIG. 7, metrics 701 are inputted into content 404 in loop tree 402 by computing engine 302 after the analysis of the transformation is performed as discussed above.

Returning to FIG. 14, in conjunction with FIGS. 1-13, in operation 1403, analyzing engine 303 of control overhead reducer 104 identifies the node (e.g., node 403) in loop tree 402 with the matric associated with the highest benefit.

As discussed above, a metric, such as the estimated execution cycles gained and the estimated increase in code size, is computed for each node (e.g., node 403) in the loop tree (e.g., loop tree 402), where each node in the loop tree represents a loop (loop is a sequence of instructions that is continually repeated until a certain condition is reached) or an if-condition (conditional statement that executes a block of code if a specified condition is true). The execution cycles gained, as used herein, refers to the reduction in the number of execution cycles that need to be performed, such as a result of the transformation (e.g., loop splitting, loop unrolling). Furthermore, the estimated increase in code size, as used herein, refers to the increase in the code size as a result of performing a transformation, such as loop splitting for an if-condition or loop unrolling for a loop. The "highest benefit," as used herein, refers to the ratio of execution cycles gained to the increase in code size (number of instructions) having the highest value.

In one embodiment, analyzing engine 303 identifies node 403 in loop tree 402 with the metric associated with the highest benefit by analyzing metrics 701 in loop tree 402 and identifying the metric with the ratio of execution cycles gained to the increase in program size having the highest value.

In operation 1404, analyzing engine 303 of control overhead reducer 104 determines if the identified node 403 in operation 1403 is a node representing an if-condition.

If the identified node 403 in operation 1403 is a node representing an if-condition, then, in operation 1405, analyzing engine 303 of control overhead reducer 104 determines if the resulting code (after performing loop splitting on the loop involved in the condition of the if-condition) fits in the instruction buffer.

In one embodiment, analyzing engine 303 obtains the available space in the instruction buffer using the remaining ( ) method in Java® for the class Buffer. In one embodiment, analyzing engine 303 performs loop splitting on the loop involved in the condition of the if-condition to determine the code size. In one embodiment, analyzing engine 303 determines if such a code size is able to fit within the available space of the instruction buffer.

If the resultant code does not fit in the instruction buffer, then, in operation 1406, analyzing engine 303 of control overhead reducer 104 does not perform the loop splitting operation. If, however, the resulting code fits in the instruction buffer, then, in operation 1407, analyzing engine 303 of control overhead reducer 104 proceeds with performing the loop splitting operation on the loop involved in the condition of the if-condition in the final version of the code.

As discussed above, in one embodiment, analyzing engine 303 performs loop splitting on the loop involved in the condition if the node is associated with an if-condition and if the resulting code fits within an instruction buffer limited in size, especially for programs for programmable accelerators. Loop splitting, as used herein, is a compiler optimization technique which attempts to simplify a loop or eliminate dependencies by breaking it into multiple loops which have the same bodies but iterate over different contiguous portions of the index range.

A discussion regarding enhancing the loop splitting operation (such an enhancement is referred to herein as "comprehensive loop splitting") by considering all the conditions on a loop iterator together and partitioning the loop as opposed to the traditional approach of considering one condition after another is provided below in connection with FIG. 15.

FIG. 15 is a flowchart of a method 1500 for enhancing loop splitting in accordance with an embodiment of the present disclosure.

Referring to FIG. 15, in conjunction with FIGS. 1-14, in operation 1501, analyzing engine 303 of control overhead reducer 104 determines if there are equivalent loop conditions, including after optimizations, in the program, such as a structured control flow program, with multiple conditional branches.

If there are equivalent loop conditions, including after optimizations, in the program, such as a structured control flow program, with multiple conditional branches, then, in operation 1502, analyzing engine 303 of control overhead reducer 104 splits the loop considering the multiple if-conditions as illustrated in FIG. 8.

Referring to FIG. 8, code 801 corresponds to the original code of the program, such as a structured control flow program, that includes equivalent loop conditions (e.g., i-loop<10 and i-loop<=9) with multiple conditional branches. In such a scenario, analyzing engine 303 splits the loop (e.g., i-loop=0 to 9 and i-loop=10 to M) considering the multiple if-conditions as shown in the resulting code 802. By considering multiple conditions together, better decisions may result including helping the cost model to be aware of the potential benefits from dead-code elimination (removing code that does not affect the program results).

If, however, there are not equivalent loop conditions in the program with multiple conditional branches, then, in operation 1503, analyzing engine 303 of control overhead reducer 104 determines if there are different loop conditions, including after optimizations, in the program, such as a structured control flow program, with multiple conditional branches.

If there are not different loop conditions in the program with multiple conditional branches, then, in operation 1504, analyzing engine 303 of control overhead reducer 104 does not perform comprehensive loop splitting.

If, however, there are different loop conditions in the program with multiple conditional branches, then, in operation 1505, analyzing engine 303 of control overhead reducer 104 determines the number of partitions to be used to split the loop iteration space (iterations performed by the structured control flow program) based on the estimated cycles gained and the estimated increase in the code size as discussed below in connection with FIG. 9.

Referring to FIG. 9, code 901 corresponds to the original code of the program, such as a structured control flow program, that includes different loop conditions (e.g., i-loop=0 to 10 and j-loop=0 to M) with multiple conditional branches. In such a scenario, analyzing engine 303 splits the loop iteration space (e.g., i-loop iteration space) into partitions (e.g., i-loop=0 to 1, i-loop=2 to 5, i-loop=6 to 8, and i-loop=9 to 10) as shown in the resulting code 902.

However, spitting of the loop iteration space into partitions may not fit in the instruction buffer. As a result, a smaller number of partitions may need to be utilized.

In one embodiment, analyzing engine 303 constructs a table (referred to herein as the "splitting table") for a loop based on the conditions referring to the loop iterator as illustrated in FIG. 10.

Referring to FIG. 10, in conjunction with FIG. 9, FIG. 10 illustrates splitting table 1000 for a loop based on all conditions (e.g., <2) referring to the loop iterator (e.g., i-loop) of code 901.

As shown in FIG. 10, column 1001 includes the iteration variable (iv) value, column 1002 indicates which iteration (e.g., iteration 0, iteration 1) has an iteration value less than 2, column 1003 indicates which iteration (e.g., iteration 2, iteration 3, iteration 4, iteration 5, iteration 6, iteration 7, iteration 8, iteration 9) has an iteration value greater than or equal to 2, column 1004 indicates which iteration (e.g., iteration 0, iteration 1, iteration 2, iteration 3, iteration 4) has an iteration value less than 5, column 1005 indicates which iteration (iteration 9) has an iteration value greater than 8, and column 1006 indicates which iteration (iteration 0, iteration 1, iteration 2, iteration 3, iteration 4, iteration 5, iteration 6, iteration 7, iteration 8) has an iteration value less than or equal to 8. In one embodiment, such columns 1002-1006 indicate which iterations satisfy the criteria (e.g., iteration value less than 2) based on having a logical value of one in the column identifying the iteration in the corresponding row of splitting table 1000.

In one embodiment, analyzing engine 303 identifies the partitions by grouping the contiguous iteration variable rows with the set of conditions in the columns of splitting table 1000 being the same as illustrated in FIG. 11.

As shown in FIG. 11, grouped rows 1101, 1102, 1103, and 1104 of splitting table 1000 correspond to those iteration variable rows with the same set of conditions in columns 1002-1006. For example, grouped row 1101 corresponds to grouping iteration variable rows 0 and 1. Grouped row 1102 corresponds to grouping iteration variable rows 2, 3 and 4. Grouped row 1103 corresponds to grouping iteration variable rows 5, 6, 7 and 8. Grouped row 1104 corresponds to a single iteration variable row, row 9.

Since not all of the partitions calculated from the grouping may fit in the instruction buffer, a metric, such as a cost metric, may be utilized to determine the optimal set of partitions that fit in the instruction buffer and maximize cycle savings. In one embodiment, such a metric corresponds to the estimated execution cycles gained and the estimated increment in the code size. In one embodiment, the estimated execution cycles gained corresponds to: (number of split IfOps)*2*Outer Bounds. IfOps, as used herein, refer to if operations in the code. Outer bounds, as used herein, refer to the loop bound, which is the upper bound of the number of loop iterations for a given program. In one embodiment, the estimated increment in the code size corresponds to: (code size not within the split)*2. In one embodiment, the cost metric corresponds to a ratio of the execution cycles gained to the increment in the code size. As illustration of selecting the partitions (e.g., partitions 1101, 1102) based on the estimated execution cycles gained and the estimated increment in the code size is provided in FIG. 12.

Referring to FIG. 12, in conjunction with FIGS. 10-11, splitting table 1000 includes a column 1201 for the cost metric (e.g., A, B, C, D) associated with each of the partitions (e.g., partitions 1101, 1102, 1103, 1104). In one embodiment, analyzing engine 303 selects the optimal set of partitions (e.g. partitions 1101, 1102) that fits in the instruction buffer limited in size based on those partitions that maximize the execution cycles gained while limiting the increase in code size.

After analyzing engine 303 determines the optimal set or number of partitions that fits in the instruction buffer limited in size, in operation 1506, analyzing engine 303 of control overhead reducer 104 splits the loop iteration space for the program (e.g., structured control flow program) having different loop conditions with multiple conditional branches into the determined number of partitions as discussed above in connection with FIG. 9.

Returning to operation 1404 of FIG. 14, if, however, the node (e.g., node 403) of loop tree 402 does not represent an if-condition, then such a node (e.g., node 403) represents a loop. As previously discussed, each node 403 of loop tree 402 represents either a loop or an if-condition.

If the node (e.g., node 403) of loop tree 402 represents a loop, then, in operation 1408, analyzing engine 303 of control overhead reducer 104 determines if the resulting code (after performing loop unrolling on the loop represented by the node) fits in the instruction buffer.

In one embodiment, analyzing engine 303 obtains the available space in the instruction buffer using the remaining ( ) method in Java® for the class Buffer. In one embodiment, analyzing engine 303 performs loop unrolling on the loop represented by the node. In one embodiment, analyzing engine 303 determines if such a code size is able to fit within the available space of the instruction buffer.

If the resultant code does not fit in the instruction buffer, then, in operation 1406, analyzing engine 303 of control overhead reducer 104 does not perform the loop unrolling operation.

If, however, the resulting code fits in the instruction buffer, then, in operation 1409, analyzing engine 303 of control overhead reducer 104 proceeds with performing the loop unrolling operation on the loop represented by the identified node (e.g., node 403) of operation 1403 in the final version of the code.

As discussed above, loop unrolling, as used herein, is a loop transformation technique that attempts to optimize a program's execution speed at the expense of its binary size, which is an approach known as space-time tradeoff. In one embodiment, the transformation is undertaken by analyzing engine 303 via an optimizing compiler. As discussed above, such a transformation is performed in the final version of the code.

Upon performing the loop splitting or loop unrolling transformations of operations 1407, 1409, respectively, in operation 1410, optimization engine 304 of control overhead reducer 104 performs optimizations on the resulting code (code after the transformation has been performed), such as removing dead code (code that does not affect the program results), constant propagation (substituting the values of known constants in expressions at compile time), etc.

As stated above, in one embodiment, optimization engine 304 utilizes various software tools for performing such optimizations, which can include, but are not limited to, LinearB®, Project Analyzer by Aivosto, SCARF, etc. Furthermore, in one embodiment, optimization engine 304 utilizes an optimizing compiler for performing such optimizations.

In operation 1411, constructing engine 301 of control overhead reducer 104 reconstructs loop tree 402 beginning with the parent of node 403 identified with the metric associated with the highest benefit. That is, constructing engine 301 reconstructs loop tree 402 with the root node of the tree corresponding to the parent of node 403 that was identified with the metric associated with the highest benefit.

A metric associated with each node 403 in the reconstructed loop tree 402 is then computed in operation 1402 as discussed above.

In this manner, control overheads for programs, such as in the case for programmable accelerators, using instruction buffers limited in size may be reduced.

Furthermore, the principles of the present disclosure improve the technology or technical field involving control overheads.

As discussed above, branching is the process of making decisions in a program by choosing one of two or more paths based on a condition. The overhead is the additional processing time required to evaluate the condition and determine the correct path to take. Looping involves repeating a set of instructions multiple times. The overhead is the additional processing time required to perform each iteration of the loop. While control overheads are necessary for program execution, excessive control overheads can result in slower program performance, increased memory usage, and other performance issues. One classical transformation to reduce control overheads is loop unrolling. Loop unrolling involves reducing the number of iterations a loop performs by executing multiple iterations (unroll factor) of the loop in a single pass. In loop unrolling, the loop is unrolled completely so that each iteration of the loop is replaced by a single instance of the loop body. Unfortunately, loop unrolling results in the increase in the size of the resulting code, which can negatively impact cache efficiency and instruction fetching. For example, in the case of programmable accelerators, instructions involved in the loop unrolling transformation may be stored in an instruction buffer (storage to hold instructions) which may be limited in size. As a result, there may not be enough space in the instruction buffer to store such instructions. Another classical transformation to reduce control overheads is loop splitting. Loop splitting involves splitting a loop into multiple sub-loops, each with a different loop index set, so that each sub-loop executes a different subset of the original loop iterations. In particular, loop splitting reduces the number of branches and conditional statements required to manage loop control. By dividing the loop into smaller sub-loops, each sub-loop can be executed without the need for complex control statements. Unfortunately, loop splitting increases the size of the resulting code. In the case of programmable accelerators, as with the loop unrolling transformation, instructions involved in the loop splitting transformation may be stored in an instruction buffer which may be limited in size. As a result, there may not be enough space in the instruction buffer to store such instructions. Consequently, loop unrolling and loop splitting transformations may compete for space in the instruction buffer, and it is not always optimal to perform one before the other. For example, by performing a loop unrolling transformation followed by a loop splitting transformation, there may not be enough room left in the instruction buffer to perform the loop splitting transformation after unrolling the loop. Similarly, in another example, by performing a loop splitting transformation followed by a loop unrolling transformation, there may not be enough room left in the instruction buffer to perform the loop unrolling transformation after performing the loop splitting transformation. Therefore, there is not currently a means for effectively reducing control overheads for programs, such as in the case for programmable accelerators, using instruction buffers limited in size.

Embodiments of the present disclosure improve such technology by constructing a loop tree from a program, such as a structured control flow program. Structured control flow, as used herein, refers to a programming concept where the flow of control to a block or region is based on single entry and single-exist methodology (SESE). In such a programming concept, during execution, the execution of the (structured) statement starts from one defined point and the execution terminates at one defined point. A loop tree, as used herein, refers to a tree-like data structure that graphically represents loop(s) and/or an if-condition(s) in a program, such as a structured control flow program. In one embodiment, a loop tree is constructed from a program by creating a set of classes or structures to represent the nodes and relationships within the tree. Such nodes may then be inserted (adding nodes) or deleted (removing nodes) via the AddChild method or DeleteChild method, respectively. A loop splitting operation or a loop unrolling operation may then be performed in connection with the node of the loop tree that is identified as having the highest benefit (ratio of execution cycles gained to the increase in code size (number of instructions) having the highest value) and if the resulting code fits in the instruction buffer. In one embodiment, the loop splitting operation is performed on the loop involved in the condition for the node (node with the highest benefit) representing an if-condition provided that the resultant code fits in the instruction buffer or the loop unrolling operation is performed on the loop for the node (node with the highest benefit) representing such a loop provided that the resultant code fits in the instruction buffer. In this manner, control overheads for programs, such as in the case for programmable accelerators, using instruction buffers limited in size may be reduced. Furthermore, in this manner, there is an improvement in the technical field involving control overheads.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for reducing control overheads, the method comprising:

constructing a loop tree from a program;

identifying a node of the loop tree having a highest ratio of execution cycles gained to an increase in code size; and performing an operation selected from the group consisting of a loop splitting operation in response to the identified node of the loop tree representing an if-condition provided that a resultant code fits in an instruction buffer and a loop unrolling operation in response to the identified node of the loop tree representing a loop provided that the resultant code fits in the instruction buffer.

2. The method as recited in claim 1 further comprising: computing a metric for each node in the loop tree.

3. The method as recited in claim 2, wherein the loop splitting operation is performed on a loop involved with the if-condition represented by the identified node.

4. The method as recited in claim 2, wherein the loop unrolling operation is performed on the loop represented by the identified node.

5. The method as recited in claim 1 further comprising:

splitting a loop considering multiple if-conditions in response to the program containing equivalent loop conditions with multiple conditional branches.

6. The method as recited in claim 1 further comprising:

determining a number of partitions to be used to split a loop iteration space based on estimated saved cycles and an estimated increase in code size; and splitting the loop iteration space into the determined number of partitions in response to the program containing different loop conditions with multiple conditional branches.

7. The method as recited in claim 1, wherein the program is a structured control flow program.

8. A computer program product for reducing control overheads, the computer program product comprising one or more computer readable storage mediums having program code embodied therewith, the program code comprising programming instructions for:

constructing a loop tree from a program;

identifying a node of the loop tree having a highest ratio of execution cycles gained to an increase in code size; and performing an operation selected from the group consisting of a loop splitting operation in response to the identified node of the loop tree representing an if-condition provided that a resultant code fits in an instruction buffer and a loop unrolling operation in response to the identified node of the loop tree representing a loop provided that the resultant code fits in the instruction buffer.

9. The computer program product as recited in claim 8, wherein the program code further comprises the programming instructions for:

computing a metric for each node in the loop tree.

10. The computer program product as recited in claim 9, wherein the loop splitting operation is performed on a loop involved with the if-condition represented by the identified node.

11. The computer program product as recited in claim 9, wherein the loop unrolling operation is performed on the loop represented by the identified node.

12. The computer program product as recited in claim 8, wherein the program code further comprises the programming instructions for:

splitting a loop considering multiple if-conditions in response to the program containing equivalent loop conditions with multiple conditional branches.

13. The computer program product as recited in claim 8, wherein the program code further comprises the programming instructions for:

determining a number of partitions to be used to split a loop iteration space based on estimated saved cycles and an estimated increase in code size; and splitting the loop iteration space into the determined number of partitions in response to the program containing different loop conditions with multiple conditional branches.

14. The computer program product as recited in claim 8, wherein the program is a structured control flow program.

15. A system, comprising:
a memory for storing a computer program for reducing control overheads; and
a processor connected to the memory, wherein the processor is configured to execute program instructions of the computer program comprising:
constructing a loop tree from a program;
identifying a node of the loop tree having a highest ratio of execution cycles gained to an increase in code size; and
performing an operation selected from the group consisting of a loop splitting operation in response to the identified node of the loop tree representing an if-condition provided that a resultant code fits in an instruction buffer and a loop unrolling operation in response to the identified node of the loop tree representing a loop provided that the resultant code fits in the instruction buffer.

16. The system as recited in claim 15, wherein the program instructions of the computer program further comprise:

computing a metric for each node in the loop tree.

17. The system as recited in claim 16, wherein the loop splitting operation is performed on a loop involved with the if-condition represented by the identified node.

18. The system as recited in claim 16, wherein the loop unrolling operation is performed on the loop represented by the identified node.

19. The system as recited in claim 15, wherein the program instructions of the computer program further comprise:
splitting a loop considering multiple if-conditions in response to the program containing equivalent loop conditions with multiple conditional branches.

20. The system as recited in claim 15, wherein the program instructions of the computer program further comprise:
determining a number of partitions to be used to split a loop iteration space based on estimated saved cycles and an estimated increase in code size; and
splitting the loop iteration space into the determined number of partitions in response to the program containing different loop conditions with multiple conditional branches.

* * * * *